United States Patent
Tong et al.

(10) Patent No.: US 12,506,342 B2
(45) Date of Patent: Dec. 23, 2025

(54) RESPONSE SYSTEM AND METHOD FOR INTEGRATED WIND-SOLAR-STORAGE ELECTRIC VEHICLE CHARGING STATION DURING THUNDERSTORM

(71) Applicant: STATE GRID JIANGSU ELECTRIC POWER CO., LTD. SUZHOU BRANCH, Jiangsu (CN)

(72) Inventors: Chong Tong, Jiangsu (CN); Yi Hong, Jiangsu (CN); Kejun Qian, Jiangsu (CN); Xujiang Shi, Jiangsu (CN); Qingfei Shu, Jiangsu (CN); Liefeng Gong, Jiangsu (CN); Jing Yuan, Jiangsu (CN); Jinwen Mai, Jiangsu (CN); Huijuan Lin, Jiangsu (CN); Ruopei Zhan, Jiangsu (CN); Zhimin Xie, Jiangsu (CN); Yu Zhou, Jiangsu (CN); Yameng Bao, Jiangsu (CN); Jiayu Zhang, Jiangsu (CN); Tao Hu, Jiangsu (CN); Sheng Jin, Jiangsu (CN)

(73) Assignee: STATE GRID JIANGSU ELECTRIC POWER CO., LTD. SUZHOU BRANCH, Suzhou (CN)

( * ) Notice: Subject to any disclaimer, the term of this patent is extended or adjusted under 35 U.S.C. 154(b) by 11 days.

(21) Appl. No.: 18/387,845

(22) Filed: Nov. 7, 2023

(65) Prior Publication Data

US 2024/0235207 A1 Jul. 11, 2024

Related U.S. Application Data

(63) Continuation-in-part of application No. PCT/CN2023/090763, filed on Apr. 26, 2023.

(30) Foreign Application Priority Data

| Apr. 27, 2022 | (CN) | 202210453581.9 |
| May 12, 2022 | (CN) | 202210514345.3 |
| Jul. 18, 2022 | (CN) | 202210841294.5 |

(51) Int. Cl.
*H02J 3/32* (2006.01)
*B60L 53/51* (2019.01)
(Continued)

(52) U.S. Cl.
CPC .............. *H02J 3/322* (2020.01); *B60L 53/51* (2019.02); *B60L 53/52* (2019.02); *B60L 53/60* (2019.02);
(Continued)

(58) Field of Classification Search
CPC .......... B60L 53/51; B60L 53/52; B60L 53/60; B60L 55/00; G01R 31/085; G06Q 10/06;
(Continued)

(56) References Cited

U.S. PATENT DOCUMENTS

| 2015/0222118 A1* | 8/2015 | Kogo | G05B 15/02 |
| | | | 700/286 |
| 2021/0066914 A1* | 3/2021 | Cai | G01W 1/16 |

FOREIGN PATENT DOCUMENTS

| CN | 110245858 A | * | 9/2019 | ......... G06Q 10/0639 |
| CN | 111539566 A | * | 8/2020 | ............. G06Q 10/04 |

OTHER PUBLICATIONS

Machine translation of Fan et al. Chinese Patent Document CN 110245858 A Sep. 2019 (Year: 2019).*
(Continued)

Primary Examiner — Kevin J Comber

(57) ABSTRACT

A response system and method for an integrated wind-solar-storage electric vehicle charging station during a thunderstorm are provided. Thunderstorm information of a region in which an integrated wind-solar-storage electric vehicle charging station and its power supply line are located is analyzed, and a tripping possibility of the power supply line
(Continued)

of the integrated wind-solar-storage electric vehicle charging station is determined. Important electrical loads of the charging station and its power supply line are classified and counted. A demand response capability of the charging station is calculated, and a corresponding quantity of important loads are matched. When the power supply line trips, a location and an isolation status of a line fault point and power transmission waiting duration are determined, and the matched important load is adjusted accordingly. The charging station is enabled to participate in a demand response in the event of a thunderstorm and line tripping.

20 Claims, 2 Drawing Sheets

(51) Int. Cl.
| | |
|---|---|
| *B60L 53/52* | (2019.01) |
| *B60L 53/60* | (2019.01) |
| *G01R 31/08* | (2020.01) |
| *G06Q 10/0631* | (2023.01) |
| *G06Q 50/06* | (2024.01) |
| *H02H 1/00* | (2006.01) |
| *H02H 7/22* | (2006.01) |
| *H02J 3/00* | (2006.01) |
| *H02J 3/40* | (2006.01) |

(52) U.S. Cl.
 CPC ...... *G01R 31/085* (2013.01); *G06Q 10/06315* (2013.01); *G06Q 50/06* (2013.01); *H02H 1/0007* (2013.01); *H02H 7/22* (2013.01); *H02J 3/00125* (2020.01); *H02J 3/0073* (2020.01); *H02J 3/40* (2013.01); *H02J 2203/10* (2020.01); *H02J 2203/20* (2020.01); *H02J 2300/24* (2020.01); *H02J 2300/28* (2020.01)

(58) Field of Classification Search
 CPC ............. G06Q 10/06315; G06Q 50/06; H02H 1/0007; H02H 7/22; H02J 3/00; H02J 3/00125; H02J 3/0073; H02J 3/322; H02J 3/381; H02J 3/40; H02J 2203/10; H02J 2203/20; H02J 2300/24; H02J 2300/28
 USPC ........................................................ 361/111
 See application file for complete search history.

(56) References Cited

OTHER PUBLICATIONS

Machine translation of Yang et al. Chinese Patent Document CN 111539566 A Aug. 2020 (Year: 2020).*

* cited by examiner

RESPONSE SYSTEM AND METHOD FOR INTEGRATED WIND-SOLAR-STORAGE ELECTRIC VEHICLE CHARGING STATION DURING THUNDERSTORM

CROSS REFERENCE TO RELATED APPLICATIONS

The present application is a Continuation-In-Part Application of PCT Application No. PCT/CN2023/090763 filed on Apr. 26, 2023, which claims the benefit of Chinese Patent Application Nos. 202210453581.9 filed on Apr. 27, 2022, 202210514345.3 filed on May 12, 2022 and 202210841294.5 filed on Jul. 18, 2022. All the above are hereby incorporated by reference in their entirety.

TECHNICAL FIELD

The present disclosure relates to the technical field of electric vehicles, and specifically, to a response system and method for an integrated wind-solar-storage electric vehicle charging station during a thunderstorm.

BACKGROUND

With an increasing shortage of a fossil fuel inventory and a yearly increase in carbon emissions, new energy sources such as wind, solar, and water are gradually replacing thermal power as main global energy sources due to their cleanliness and renewability. This further promotes the development of carbon emission reduction equipment such as a wind power device, a photovoltaic device, an energy storage apparatus, and an electric vehicle, making the carbon emission reduction equipment be applied more widely. In a process of building a new-type power system, a large quantity of flexible resources such as the new energy sources and flexible loads are assembled and integrated into the power system, and an integrated wind-solar-storage electric vehicle charging station is a typical flexible resource complex. In addition, a "source-network-load" nature of equipment in the new-type power system can be changed as required, and the electric vehicle has been explored with richer demand response value by using a vehicle-to-grid (V2G) technology.

At present, experts have made in-depth and extensive researches on participation of the electric vehicle in a demand response, but there are still three aspects that have not been effectively addressed. Firstly, the existing researches on the participation of the electric vehicle in the demand response are mainly based on a typical scenario with a good weather condition, and there are few researches on the demand response when a power supply line trips during a thunderstorm. However, in the past decade, global lightning activities have increased by 12%, and a probability that the power supply line trips during the thunderstorm has significantly increased. Performance of the integrated wind-solar-storage electric vehicle charging station in this research scenario is also difficult to maintain consistency with that under a normal weather condition. Secondly, most researches show that modeling, big data mining, and other methods are used to predict wind and photovoltaic power generation, as well as a driving behavior of the electric vehicle, and perform all-day planning for a charging and discharging strategy. However, a resulting strategy deviates from an actual situation. With use of collectors and sensor apparatuses, progress in communication technologies, optimization of algorithms, and improvement of computer computing capabilities, outputs of wind and photovoltaic power and a status of the electric vehicle can be read in a timely manner, and an optimal charging and discharging strategy can be formulated or adjusted in the timely manner to be closer to an actual need. Thirdly, in the existing researches, the electric vehicle is mainly used to perform peak-load shifting on a load curve, suppress power outputs of the new energy sources, balance comprehensive energy sources, and the like. The electric vehicle is rarely used as an emergency power source to supply power to an important load and alleviate mismatched power between power supply and power consumption in the event of line tripping in a power grid. The research on the above three aspects can further improve a research scenario of the electric vehicle, expand an application scope of the electric vehicle, and support stable operation of the power grid.

SUMMARY

In order to overcome the shortcomings of the prior art, the present disclosure is intended to provide a response system and method for an integrated wind-solar-storage electric vehicle charging station during a thunderstorm, to meet a demand response of the integrated wind-solar-storage electric vehicle charging station under thunderstorm weather.

The present disclosure adopts following technical solutions.

A response system for an integrated wind-solar-storage electric vehicle charging station during a thunderstorm includes a lightning tripping coefficient calculation module, an important electrical load classification module, an important load power and electricity quantity matching module, a power supply line tripping determining module, an important electrical load power and power consumption adjustment module, a demand response target realization module, and a power supply line tripping accident determining module, where the lightning tripping coefficient calculation module is configured to collect thunderstorm forecast information and historical tripping information of a power supply line on which an electric vehicle charging station is located in a region, calculate a lightning tripping coefficient, and determine whether to call the important electrical load classification module in the system based on a calculation result;

the important electrical load classification module is configured to separately take statistics on power and a required electricity quantity of an important electrical load on each section of the line, and input a result into the important load power and electricity quantity matching module;

the important load power and electricity quantity matching module is configured to calculate, based on the received result, power of a matching important load before line tripping and an electricity quantity of the matching important load before the line tripping;

the power supply line tripping determining module is configured to: determine whether the power supply line on which the electric vehicle charging station is located trips at this time; and if the power supply line trips, call the important electrical load power and power consumption adjustment module; or if the power supply line does not trip, re-call the lightning tripping coefficient calculation module;

the important electrical load power and power consumption adjustment module is configured to determine a location and an isolation status of a line fault point and power transmission waiting duration, so as to adjust power and an electricity quantity of an electrical load matching a demand response of the charging station, and call the demand response target realization module; and the demand response target realization module is configured to calculate a minimum variance of unmatched power between power generation and power consumption of an isolated power grid in which the integrated wind-solar-storage electric vehicle charging station is located.

The important load power and electricity quantity matching module is configured to extend from the charging station to two ends of the line, number each section of the line from near to far by using a line disconnector as a demarcation point, and take statistics on the power and the required electricity quantity of the important electrical load on each section of the line based on different requirements for power consumption reliability.

The demand response target realization module is configured to: set an objective function for minimizing a variance of the mismatched power $\Delta dis(i_t)$ of the power grid in which the charging station is located after lightning tripping, and synchronously sample wind, solar and storage power output data by taking $t_{10}$ as a charging and discharging strategy adjustment cycle, so as to optimize a charging and discharging strategy of an electric vehicle participating in the demand response in each charging and discharging strategy adjustment cycle, with a goal of minimizing the mismatched power of the power grid in which the charging station is located; and synchronously send an optimized charging and discharging strategy to each charging pile for execution.

The objective function for minimizing the variance of the mismatched power $\Delta dis(i_t)$ between the power generation and the power consumption of the isolated power grid in which the integrated wind-solar-storage electric vehicle charging station is located is obtained by calculating a minimum solution of an average value, in all optimization periods, of a square of a difference between the mismatched power between the power generation and the power consumption and average mismatched power between the power generation and power consumption in all the optimization periods.

The mismatched power between the power generation and the power consumption of the isolated power grid in which the integrated wind-solar-storage electric vehicle charging station is located is obtained by calculating a difference between totally generated power in the isolated power grid and totally consumed power in the isolated power grid.

The present disclosure further provides a response method for an integrated wind-solar-storage electric vehicle charging station during a thunderstorm, specifically includes following steps:

step 1: collecting thunderstorm forecast information of a region in which an electric vehicle charging station and its power supply line are located and historical tripping information of the power supply line, calculating a lightning tripping coefficient based on the collected information, and performing a step 2 if the lightning tripping coefficient is greater than an alarm value or repeating the step 1 if the lightning tripping coefficient is not greater than the alarm value;

step 2: performing line-based sectioning for important electrical loads of the electric vehicle charging station and its power supply line;

step 3: calculating a demand response capability of the electric vehicle charging station, and matching power and electricity quantities of a corresponding quantity of important electrical loads;

step 4: determining whether the power supply line of the electric vehicle charging station trips at this time, and performing a step 5 if the power supply line of the electric vehicle charging station trips, or returning to the step 1 if the power supply line of the electric vehicle charging station does not trip;

step 5: determining a location and an isolation status of a line fault point and power transmission waiting duration, and adjusting the matched power and electricity quantity of the important electrical load;

step 6: enabling the electric vehicle charging station to participate in a demand response in the event of a thunderstorm and line tripping; and step 7: determining whether handling of a power supply line tripping accident is completed, and stopping, by the charging station, supplying power to an important load on the power supply line of the charging station if the handling of the power supply line tripping accident is completed, or returning to the step 6 if the handling of the power supply line tripping accident is not completed.

The step 1 includes following substeps:

step 1.1: collecting the thunderstorm forecast information of the region in which the electric vehicle charging station and its power supply line are located, where the thunderstorm forecast information includes: a northernmost latitude $Lat_{n.T}$, a southernmost latitude $Lat_{s.T}$, a westernmost longitude $Lon_{w.T}$, and an easternmost longitude $Lon_{e.T}$ of an predicted thunderstorm, predicted start time $T_{sta}$ of the thunderstorm, duration $T_{end}$ of the thunderstorm, wind force WF during the thunderstorm, a lightning frequency $N_{fla}$ during the thunderstorm, and a period $T_{fla}$ during which lightning easily occurs;

step 1.2: calculating an average value for thunderstorm forecast information of a same type; and step 1.3: calculating a tripping possibility based on average thunderstorm forecast information and the historical tripping information of the power supply line.

The tripping possibility Trip meets a following relational expression:

$$Trip_{warn} = b_1 \cdot \eta_{EV.T} + b_2 \cdot WF^* + b_3 \cdot N^*_{fla} + b_4 \cdot T_{end}^*$$

where $\eta_{EV.T}$ represents an overlapping ratio matrix of the region in which the electric vehicle charging station and its power supply line are located and a thunderstorm range during historical thunderstorm weather; WF* represents a normalized wind force matrix during the thunderstorm; $N^*_{fla}$ represents a normalized lightning frequency matrix during the thunderstorm; $T_{end}^*$ represents a normalized thunderstorm duration matrix; and $b_1$, $b_2$, $b_3$, and $b_4$ respectively represent a first regression coefficient, a second regression coefficient, a third regression coefficient, and a fourth regression coefficient.

The overlapping ratio matrix $\eta_{EV.T}$ of the region in which the electric vehicle charging station and its power supply line are located and the thunderstorm range during the historical thunderstorm weather is constituted by an overlapping ratio $\eta_{EV.T}$ between the region in which the electric vehicle charging station and its power supply line are located and the thunderstorm range during the historical thunderstorm weather, and the $\eta_{EV.T}$ meets a following relational expression:

$$\eta_{EV.T} = \frac{[\text{Area}_{EV.T}(1,2) - \text{Area}_{EV.T}(1,1)] \cdot [\text{Area}_{EV.T}(2,2) - \text{Area}_{EV.T}(2,1)]}{[Lat_{n.EV} - Lat_{s.EV}] \cdot [Lon_{e.EV} - Lon_{w.EV}]}$$

where $Lat_{n.EV}$ represents a northernmost latitude of the region in which the power supply line is located, $Lat_{s.EV}$ represents a southernmost latitude of the region in which the power supply line is located, $Lon_{w.EV}$ represents a westernmost longitude of the region in which the power supply line is located, $Lon_{e.EV}$ represents an easternmost longitude of the region in which the power supply line is located, $\text{Area}_{EV.T}(1,1)$ represents a value of a first row and a first column of a matrix $\text{Area}_{EV.T}$, $\text{Area}_{EV.T}(1,2)$ represents a value of the first row and a second column of the matrix $\text{Area}_{EV.T}$, $\text{Area}_{EV.T}(2,1)$ represents a value of a second row and the first column of the matrix $\text{Area}_{EV.T}$, and $\text{Area}_{EV.T}(2,2)$ represents a value of the second row and the second column of the matrix $\text{Area}_{EV.T}$; and the matrix $\text{Area}_{EV.T}$ meets a following relational expression:

$$\text{Area}_{EV.T} = \begin{bmatrix} LAT(1,2) & LAT(1,3) \\ LON(1,2) & LON(1,3) \end{bmatrix}$$

where $LAT(1,2)$ represents a first value and a second value in $LAT_{1\times 4}$, $LAT(1,3)$ represents the first value and a third value in the $LAT_{1\times 4}$; $LON(1,2)$ represents a first value and a second value in $LON_{1\times 4}$, and $LAT(1,3)$ represents the first value and a third value in the $LON_{1\times 4}$;

$$LAT_{1\times 4} = \text{sort}\{[\; Lat_{n.T} \;\; Lat_{s.T} \;\; Lat_{n.EV} \;\; Lat_{s.EV} \;]\}$$

$$LON_{1\times 4} = \text{sort}\{[\; Lon_{w.T} \;\; Lon_{e.T} \;\; Lon_{w.EV} \;\; Lon_{e.EV} \;]\}$$

where $\text{sort}\{\cdot\}$ represents an operation of sorting elements in the matrix in ascending order, $Lat_{n.T}$ represents the northernmost latitude of the predicted thunderstorm, $Lat_{s.T}$ represents the southernmost latitude of the predicted thunderstorm, $Lon_{w.T}$ represents the westernmost longitude of the predicted thunderstorm, and $Lon_{e.T}$ represents the easternmost longitude of the predicted thunderstorm.

In the step 2, assuming that the electric vehicle charging station is located in a middle section of the power supply line, a disconnector is used as a demarcation point for each section of the power supply line, and there are a certain quantity of electrical loads on each section of the line, a plurality of sections of the power supply line are obtained by extending from the electric vehicle charging station to two ends of the power supply line and taking the disconnector as the demarcation point, and each section of the power supply line is numbered from near to far, such that power $P_{imp}$ and an electricity quantity $Q_{imp}$ of an important electrical load on each section of the power supply line meet a following relational expression:

$$P_{imp} = [\; P_{imp}(1) \;\; P_{imp}(2) \;\; \ldots \;\; P_{imp}(i_l) \;\; \ldots \;\; P_{imp}(N_l) \;]$$

$$Q_{imp} = [\; Q_{imp}(1) \;\; Q_{imp}(2) \;\; \ldots \;\; Q_{imp}(i_l) \;\; \ldots \;\; Q_{imp}(N_l) \;]$$

where $N_l$ represents a total quantity of sections of the power supply line, $P_{imp}(i_l)$ represents power of an important electrical load on an $i_l^{th}$ section of the power supply line, and $Q_{imp}(i_l)$ represents an electricity quantity of the important electrical load on the $i_l^{th}$ section of the power supply line.

The step 3 includes following substeps:

step 3.1: within a specified time range $t_{10}$ before the predicted start time of the thunderstorm, collecting a parameter of an electric vehicle being charged in the electric vehicle charging station and a parameter of an electric vehicle participating in the demand response in a specified region; and step 3.2: calculating the demand response capability of the electric vehicle charging station based on average wind, solar and storage output power, and matching the power $P_{imp.a}$ and the electricity quantities $Q_{imp.a}$ of the corresponding quantity of important electrical loads according to following relational expressions:

$$\begin{cases} P_{imp.a} = \sum_{i=1}^{N_l'} P_{imp}(i) < PD_{station} \\ Q_{imp.a} = \sum_{i=1}^{N_l'} Q_{imp}(i) < QD_{EVS} \end{cases}$$

where $N_l'$ represents a total quantity of sections of the power supply line that contain the important electrical load and that can be carried by the electric vehicle charging station, $P_{imp}(i)$ represents matched power of the important electrical load before an $i^{th}$ section of the power supply line trips, $Q_{imp}(i)$ represents a matched electricity quantity of the important electrical load before the $i^{th}$ section of the power supply line trips, $PD_{station}$ represents an predicted power output of the electric vehicle charging station in participating in the demand response, and $QD_{EVS}$ represents a dischargeable capacity of the electric vehicle.

The predicted power output $PD_{station}$ of the electric vehicle charging station in participating in the demand response meets a following relational expression:

$$PD_{station} = P_{W.ave} + P_{PV.ave} + P_{S.ave} \cdot \eta_{S.d} + \sum_{ii=1}^{N_{EV.D}} P_{EV.d}(ii) \cdot \eta_{EV.d}$$

where $P_{W.ave}$, $P_{PV.ave}$, and $P_{S.ave}$ respectively represent average output power of a wind turbine generator, a photovoltaic inverter, and an energy storage apparatus, $P_{EV.d}(ii)$ represents discharging power of an $ii^{th}$ electric vehicle, $\eta_{S.d}$ represents discharging efficiency of the energy storage apparatus, $\eta_{EV.d}$ represents discharging efficiency of the electric vehicle, and $N_{EV.D}$ represents a total quantity of electric vehicles that participate in discharging.

The step 5 includes following substeps:

step 5.1: determining the location of the line fault point, time required for isolating and repairing the fault point, and the power transmission waiting duration; and step 5.2: adjusting, based on an opened/closed state of the line disconnector according to a following relational expression, power $P_{imp.b}$ and an electricity quantity $Q_{imp.b}$ of an important electrical load matching the demand response of the electric vehicle charging station:

$$\begin{cases} P_{imp.b} = \sum_{i=1}^{N'_l} P_{imp}(i) - \sum_{i=1}^{N''_l} P_{imp}(i) + \sum_{i=1}^{N'-N''_l} P_{com}(i) < PD_{station} \\ Q_{imp.b} = \sum_{i=1}^{N'_l} Q_{imp}(i) - \sum_{i=1}^{N''_l} Q_{imp}(i) + \sum_{i=1}^{N'-N''_l} Q_{com}(i) < QD_{EVS} \end{cases}$$

where $$\sum_{i=1}^{N''_l} P_{imp}(i)$$

and $$\sum_{i=1}^{N''_l} Q_{imp}(i)$$

respectively represent power and an electricity quantity of an important electrical load to which no power can be transmitted based on a matching scheme before the tripping because the disconnector is opened;

$$\sum_{i=1}^{N'-N''_l} P_{com}(i)$$

and $$\sum_{i=1}^{N'-N''_l} Q_{com}(i)$$

respectively represent power and an electricity quantity of another electrical load that can be powered on the power supply line, where the power of the another electrical load represents load power excluding the power of the important electrical load, and the electricity quantity of the another electrical load represents an electricity quantity of a load, excluding the electricity quantity of the important electrical load; and $N_l''$ represents a quantity of sections of the power supply line, which cannot be powered based on the matching scheme before the tripping because the disconnector is opened.

In the step 6, a minimum variance of mismatched power $\Delta dis(i_t)$ between power generation and power consumption of a power grid in which the electric vehicle charging station is located after lightning tripping is used as an objective function, and a time range $t_{10}$ is set as a charging and discharging strategy adjustment cycle to synchronously sample wind, solar and storage power output data and obtain the mismatched power between the power generation and the power consumption of the power grid in which the electric vehicle charging station is located after the lightning tripping in each charging and discharging strategy adjustment cycle, to optimize a charging and discharging strategy of the electric vehicle charging station in participating in the demand response; and an optimized charging and discharging strategy is synchronously sent to each charging pile for execution.

The minimum variance of the mismatched power $\Delta dis(i_t)$ between the power generation and the power consumption of the isolated power grid in which the integrated wind-solar-storage electric vehicle charging station is located is used as the objective function, which meets a following relational expression:

$$\min\{D(\Delta dis)\} = \min\left\{\frac{1}{n_t}\sum_{i_t=1}^{n_t}\left[\Delta dis(i_t) - \frac{1}{n_t}\sum_{i_t=1}^{n_t}\Delta dis(i_t)\right]^2\right\}$$

where $n_t$ represents a total quantity of time points within an optimization period.

The mismatched power $\Delta dis(i_t)$ between the power generation and the power consumption of the isolated power grid in which the integrated wind-solar-storage electric vehicle charging station is located meets following relational expressions:

$$\Delta dis(i_t) = G_P(i_t) - L_P(i_t)$$

$$G_P(i_t) = P_W(i_t) + P_{PV}(i_t) + \sum_{j=1}^{N_{S.D}(i_t)} P_{S.d}(i_t, j) \cdot \eta_{S.d} + \sum_{k=1}^{N_{EV.D}(i_t)} P_{EV.d}(i_t, k) \cdot \eta_{EV.d}$$

$$L_P(i_t) = P_{imp.b}(i_t) + \sum_{j=1}^{N_{S.C}(i_t)} P_{S.c}(i_t, j)/\eta_{S.c} + \sum_{k=1}^{N_{EV.C}(i_t)} P_{EV.c}(i_t, k)/\eta_{EV.c}$$

where $G_P(i_t)$ and $L_P(i_t)$ respectively represent totally generated power and totally consumed power within the isolated power grid; $P_W(i_t)$, $P_{PV}(i_t)$, $P_{S.d}(i_t,j)$, and $P_{EV.d}(i_t,k)$ respectively represent wind power in the integrated wind-solar-storage electric vehicle charging station at an $i_t^{th}$ time point, photovoltaic power in the integrated wind-solar-storage electric vehicle charging station at the $i_t^{th}$ time point, output power of a $j^{th}$ energy storage apparatus at the $i_t^{th}$ time point, and output power of a $k^{th}$ electric vehicle at the $i_t^{th}$ time point; $P_{imp.b}(i_t)$, $P_{S.c}(i_t,j)$, and $P_{EV.c}(i_t,k)$ respectively represent power of the important electrical load of the integrated wind-solar-storage electric vehicle charging station at the $i^{th}$ time point, power consumed by the $j^{th}$ energy storage apparatus at the $i_t^{th}$ time point, and power consumed by the $k^{th}$ electric vehicle at the $i_t^{th}$ time point; $N_{S.D}(i_t)$, $N_{EV.D}(\ )$, $N_{S.C}(i_t)$, and $N_{EV.C}(i_t)$ respectively represent a total quantity of energy storage apparatuses that output power in the integrated wind-solar-storage electric vehicle charging station at the $i_t^{th}$ time point, a total quantity of electric vehicles that output power in the integrated wind-solar-storage electric vehicle charging station at the $i_t^{th}$ time point, a total quantity of energy storage apparatuses that absorb power in the integrated wind-solar-storage electric vehicle charging station at the $i_t^{th}$ time point, and a total quantity of electric vehicles that absorb power in the integrated wind-solar-storage electric vehicle charging station at the $i_t^{th}$ time point; $\eta_{EV.c}$ and $\eta_{S.c}$ respectively represent charging efficiency of the electric vehicle and charging efficiency of the energy storage apparatus; and $\eta_{S.d}$ and $\eta_{EV.d}$ respectively represent discharging efficiency of the energy storage apparatus and discharging efficiency of the electric vehicle.

The objective function needs to meet a constraint that a total generating capacity of the integrated wind-solar-storage electric vehicle charging station is greater than a sum of an electricity quantity charged for the electric vehicle and electricity quantities of all important electrical loads, and an excess electricity quantity is stored in the electric vehicle or the energy storage apparatus, and meets a following relational expression:

$$\sum_{i_t=1}^{n_t} G_P(i_t) > \sum_{i_t=1}^{n_t}\left[P_{imp.b}(i_t) + \sum_{k=1}^{N_{EV\_C}(i_t)} P_{EV.c}(i_t, k)/\eta_{EV.c}\right].$$

The objective function needs to meet a charging and discharging power constraint and an energy constraint of the energy storage apparatus, namely:

$$P_{S.c.min} \le P_{S.c}(i_t) \le P_{S.c.max}$$
$$QD_{S.min} \le QD_S + P_{S.c} \cdot \Delta t \le E_s$$
$$P_{S.d.min} \le P_{S.d}(i_t) \le P_{S.d.max}$$
$$QD_{S.min} \le QD_S - P_{S.d} \cdot \Delta t \le E_s$$

where $\Delta t$ represents a sampling interval; $P_{S.c.min}$, $P_{S.c.max}$, $P_{S.d.min}$, and $P_{S.d.max}$ respectively represent minimum charging power, maximum charging power, minimum discharging power, and maximum discharging power of the energy storage apparatus; $QD_{S.min}$ represents a minimum remaining electricity quantity of the energy storage apparatus; $E_S$ represents a total capacity of the energy storage apparatus; $QD_S$ represents an electricity quantity that the energy storage apparatus can discharge; $P_{S.c}$ represents charging power of the energy storage apparatus; $P_{S.d}$ represents discharging power of the energy storage apparatus; $P_{S.c}(i_t)$ represents charging power of the energy storage apparatus in an $i_t^{th}$ optimization period; and $P_{S.d}(i_t)$ represents discharging power of the energy storage apparatus in the $i_t^{th}$ optimization period.

The objective function needs to meet a charging and discharging power constraint and an energy constraint of the electric vehicle, namely:

$$P_{EV.c.min} \le P_{EV.c}(i_t) \le P_{EV.c.max}$$
$$QD_{EV.min} \le QD_{EV} + P_{EV.c} \cdot \Delta t \le E_{EV}$$
$$P_{EV.d.min} \le P_{EV.d}(i_t) \le P_{EV.d.max}$$
$$Q_{EV.min} \le QD_{EV} - P_{EV.d} \cdot \Delta t \le E_{EV}$$

where $P_{EV.c.min}$, $P_{EV.c.max}$, $P_{EV.d.min}$, and $P_{EV.d.max}$ respectively represent minimum charging power, maximum charging power, minimum discharging power, and maximum discharging power of the electric vehicle; $QD_{EV.min}$ represents a minimum electricity quantity that the electric vehicle can discharge; $QD_{EV}$ represents an electricity quantity that the electric vehicle can discharge; $P_{EV.c}$ represents power consumed by the electric vehicle; $P_{EV.d}$ represents discharging power of the electric vehicle; $P_{EV.d}(i_t)$ represents discharging power of the electric vehicle at the $i_t^{th}$ time point; $Q_{EV.min}$ represents a minimum electricity quantity demand of the electric vehicle; $P_{EV.c}(i_t)$ represents charging power of the electric vehicle; and $E_{EV}$ represents a total electricity quantity of all electric vehicles.

The objective function needs to meet a constraint on a quantity of charging and discharging conversions of the electric vehicle, namely:

$$\sum_{i_t=1}^{n_t} n_{dc}(i_t) < N_{dc.max}$$

where $n_{dc}(i_t)$ represents a quantity of charging and discharging conversions of the electric vehicle at the $i_t^{th}$ time point, wherein 1 is counted when there is one conversion and 0 is counted when there is no conversion; and $N_{dc.max}$ represents a maximum quantity of charging and discharging conversions allowed for the electric vehicle.

The present disclosure has following beneficial effects compared with the prior art:

Firstly, the present disclosure can assist the integrated wind-solar-storage electric vehicle charging station in utilizing multi-platform meteorological information and historical power supply line tripping information to accurately analyze and predict whether the thunderstorm in the region in which the integrated wind-solar-storage electric vehicle charging station and its power supply line are located affects normal power supply of the charging station, and can estimate in advance an important load that can be supported by the charging station.

Secondly, the present disclosure further expands application scenarios of the integrated wind-solar-storage electric vehicle charging station and the electric vehicle in a power system, and controls, by means of real-time optimization and release of a demand response strategy, the integrated wind-solar-storage electric vehicle charging station and the electric vehicle to participate in the demand response based on accident handling and reconstruction of a distribution line under the thunderstorm weather. In addition, the demand response is stopped in time after the accident handling to prevent asynchronous grid connection.

Thirdly, the present disclosure utilizes a charging and discharging capability of the integrated wind-solar-storage electric vehicle charging station to support power supply for an important load near the charging station when the thunderstorm occurs and the power supply line trips, and adjusts the powered important load in real-time based on stored energy of the charging station and a fault isolation status of the distribution line. In addition, the present disclosure utilizes charging and discharging capabilities of the electric vehicle and the energy storage apparatus to suppress a power mismatch between new energy generation and power consumption of the important load.

DETAILED DESCRIPTION

The present disclosure is further described below with reference to the accompanying drawings. The following embodiments are only used for describing the technical solutions of the present invention more clearly, and are not intended to limit the protection scope of the present invention.

Figure 2:
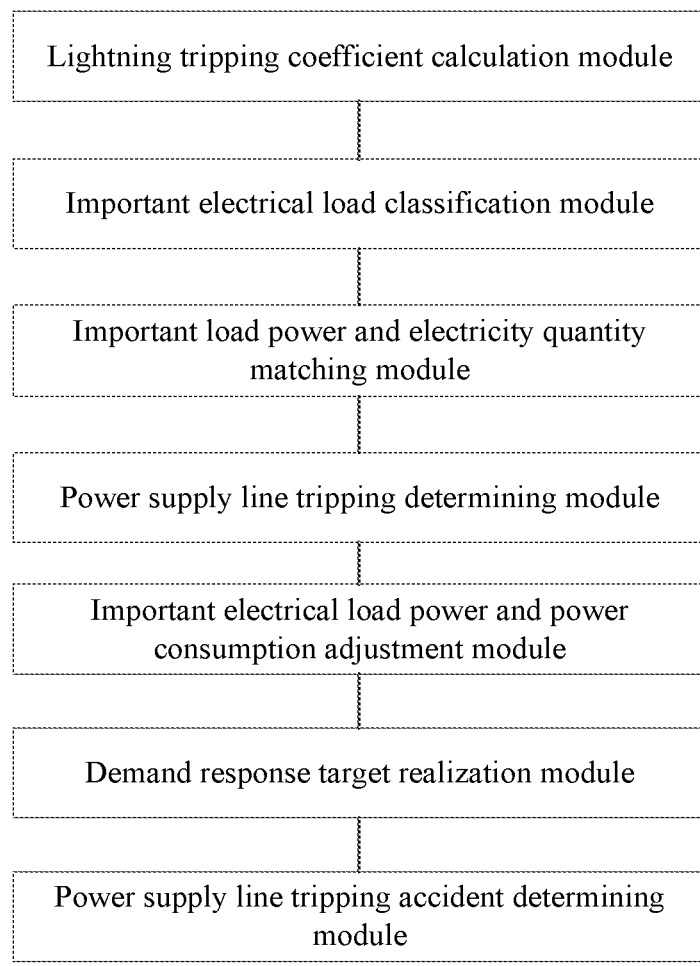
FIG. 2 is a schematic structural diagram of a response system for an integrated wind-solar-storage electric vehicle charging station during a thunderstorm.

As shown in FIG. 2, a response system for an integrated wind-solar-storage electric vehicle charging station during a thunderstorm includes a lightning tripping coefficient calculation module, an important electrical load classification module, an important load power and electricity quantity matching module, a power supply line tripping determining module, an important electrical load power and power consumption adjustment module, a demand response target realization module, and a power supply line tripping accident determining module.

The lightning tripping coefficient calculation module is configured to collect thunderstorm forecast information and historical tripping information of a power supply line on which an electric vehicle charging station is located in a region, calculate a lightning tripping coefficient, and determine whether to call the important electrical load classification module in the system based on a calculation result.

The important electrical load classification module is configured to extend from the charging station to two ends of the line, number each section of the line from near to far by using a line disconnector as a demarcation point, take statistics on power and a required electricity quantity of an important electrical load on each section of the line based on different requirements for power consumption reliability, and input a result into the important load power and electricity quantity matching module.

The important load power and electricity quantity matching module is configured to calculate, based on the received result, power of a matching important load before line tripping and an electricity quantity of the matching important load before the line tripping.

The power supply line tripping determining module is configured to: determine whether the power supply line on which the electric vehicle charging station is located trips at this time; and if the power supply line trips, call the important electrical load power and power consumption adjustment module; or if the power supply line does not trip, re-call the lightning tripping coefficient calculation module.

The important electrical load power and power consumption adjustment module is configured to determine a location and an isolation status of a line fault point and power transmission waiting duration, so as to adjust power and an electricity quantity of an electrical load matching a demand response of the charging station, and call the demand response target realization module.

The demand response target realization module is configured to calculate a minimum variance of unmatched power between power generation and power consumption of an isolated power grid in which the integrated wind-solar-storage electric vehicle charging station is located.

An objective function for minimizing a variance of the mismatched power $\Delta dis(i_t)$ of the power grid in which the charging station is located after lightning tripping is set, and wind, solar and storage power output data is synchronously sampled by taking $t_{10}$ as a charging and discharging strategy adjustment cycle, so as to optimize a charging and discharging strategy of an electric vehicle participating in the demand response in each charging and discharging strategy adjustment cycle, with a goal of minimizing the mismatched power of the power grid in which the charging station is located; and an optimized charging and discharging strategy is synchronously sent to each charging pile for execution.

The objective function for minimizing the variance of the mismatched power $\Delta dis(i_t)$ between the power generation and the power consumption of the isolated power grid in which the integrated wind-solar-storage electric vehicle charging station is located meets a following relational expression:

$$\min\{D(\Delta dis)\} = \min\left\{\frac{1}{n_t}\sum_{i_t=1}^{n_t}\left[\Delta dis(i_t) - \frac{1}{n_t}\sum_{i_t=1}^{n_t}\Delta dis(i_t)\right]^2\right\}$$

In the above relational expression, $n_t$ represents a total quantity of time points within an optimization period.

The mismatched power $\Delta dis(i_t)$ between the power generation and the power consumption of the isolated power grid in which the integrated wind-solar-storage electric vehicle charging station is located meets following relational expressions:

$$\Delta dis(i_t) = G_P(i_t) - L_P(i_t)$$

$$G_P(i_t) = P_W(i_t) + P_{PV}(i_t) + \sum_{j=1}^{N_{S.D}(i_t)} P_{S.d}(i_t, j) \cdot \eta_{S.d} + \sum_{k=1}^{N_{EV.D}(i_t)} P_{EV.d}(i_t, k) \cdot \eta_{EV.d}$$

$$L_P(i_t) = P_{imp.b}(i_t) + \sum_{j=1}^{N_{S.C}(i_t)} P_{S.c}(i_t, j)/\eta_{S.c} + \sum_{k=1}^{N_{EV.C}(i_t)} P_{EV.c}(i_t, k)/\eta_{EV.c}$$

In the above relational expressions, $G_P(i_t)$ and $L_P(i_t)$ respectively represent totally generated power and totally consumed power within the isolated power grid, which are in units of kW; $P_W(i_t)$, $P_{PV}(i_t)$, $P_{S.d}(i_t,j)$, and $P_{EV.d}(i_t,k)$ respectively represent wind power in the integrated wind-solar-storage electric vehicle charging station at an $i_t^{th}$ time point, photovoltaic power in the integrated wind-solar-storage electric vehicle charging station at the $i_t^{th}$ time point, output power of a $j^{th}$ energy storage apparatus at the $i_t^{th}$ time point, and output power of a $k^{th}$ electric vehicle at the $i_t^{th}$ time point, which are in units of kW; $P_{imp.b}(i_t)$, $P_{S.c}(i_t,j)$, and $P_{EV.c}(i_t,k)$ respectively represent power consumed by the important load of the charging station at the $i_t^{th}$ time point, power consumed by the $j^{th}$ energy storage apparatus at the $i_t^{th}$ time point, and power consumed by the $k^{th}$ electric vehicle at the $i_t^{th}$ time point, which are in units of kW; $N_{S.D}(i_t)$, $N_{EV.D}(i_t)$, $N_{S.C}(i_t)$, and $N_{EV.C}(i_t)$ respectively represent a total quantity of energy storage apparatuses that output power in the charging station at the $i_t^{th}$ time point, a total quantity of electric vehicles that output power in the charging station at the $i_t^{th}$ time point, a total quantity of energy storage apparatuses that absorb power in the charging station at the $i_t^{th}$ time point, and a total quantity of electric vehicles that absorb power in the charging station at the $i_t^{th}$ time point; $i_{EV.c}$ and $\eta_{S.c}$ respectively represent charging efficiency of the electric vehicle and charging efficiency of the energy storage apparatus; and $\eta_{S.d}$ and $\eta_{EV.d}$ respectively represent discharging efficiency of the energy storage apparatus and discharging efficiency of the electric vehicle.

The power supply line tripping accident determining module is configured to: determine whether handling of a power supply line tripping accident is completed, and enable the charging station to stop supplying power to an important load on the power supply line of the charging station and resume power supply to the power supply line if the handling of the power supply line tripping accident is completed, or re-call the important electrical load power and power consumption adjustment module if the handling of the power supply line tripping accident is not completed.

The demand response target realization module is configured to: set the objective function for minimizing the variance of the mismatched power $\Delta dis(i_t)$ of the power grid in which the charging station is located after the lightning tripping, and synchronously sample the wind, solar and storage power output data by taking $t_{10}$ as the charging and discharging strategy adjustment cycle, so as to optimize the charging and discharging strategy of the electric vehicle participating in the demand response in each charging and discharging strategy adjustment cycle, with the goal of minimizing the mismatched power of the power grid in which the charging station is located; and synchronously send the optimized charging and discharging strategy to each charging pile for execution.

The objective function for minimizing the variance of the mismatched power $\Delta dis(i_t)$ between the power generation and the power consumption of the isolated power grid in which the integrated wind-solar-storage electric vehicle charging station is located is obtained by calculating a minimum solution of an average value, in all optimization periods, of a square of a difference between the mismatched power between the power generation and the power consumption and average mismatched power between the power generation and power consumption in all the optimization periods.

The mismatched power between the power generation and the power consumption of the isolated power grid in which the integrated wind-solar-storage electric vehicle charging station is located is obtained by calculating a difference between totally generated power in the isolated power grid and totally consumed power in the isolated power grid.

In the embodiments of the present disclosure, the lightning tripping coefficient calculation module, the important electrical load classification module, the important load power and electricity quantity matching module, the power supply line tripping determining module, the important electrical load power and power consumption adjustment module, the demand response target realization module, and the power supply line tripping accident determining module each may be one or more processors or chips that each have a communication interface, can realize a communication protocol, and may further include a memory, a related interface and system transmission bus, and the like if necessary. The processor or chip executes program-related code to realize a corresponding function. In an alternative solution, the lightning tripping coefficient calculation module, the important electrical load classification module, the important load power and electricity quantity matching module, the power supply line tripping determining module, the important electrical load power and power consumption adjustment module, the demand response target realization module, and the power supply line tripping accident determining module may share an integrated chip or share a processor, a memory, and other devices. The shared processor or chip can execute a program-related code to implement a corresponding function.

Figure 1:
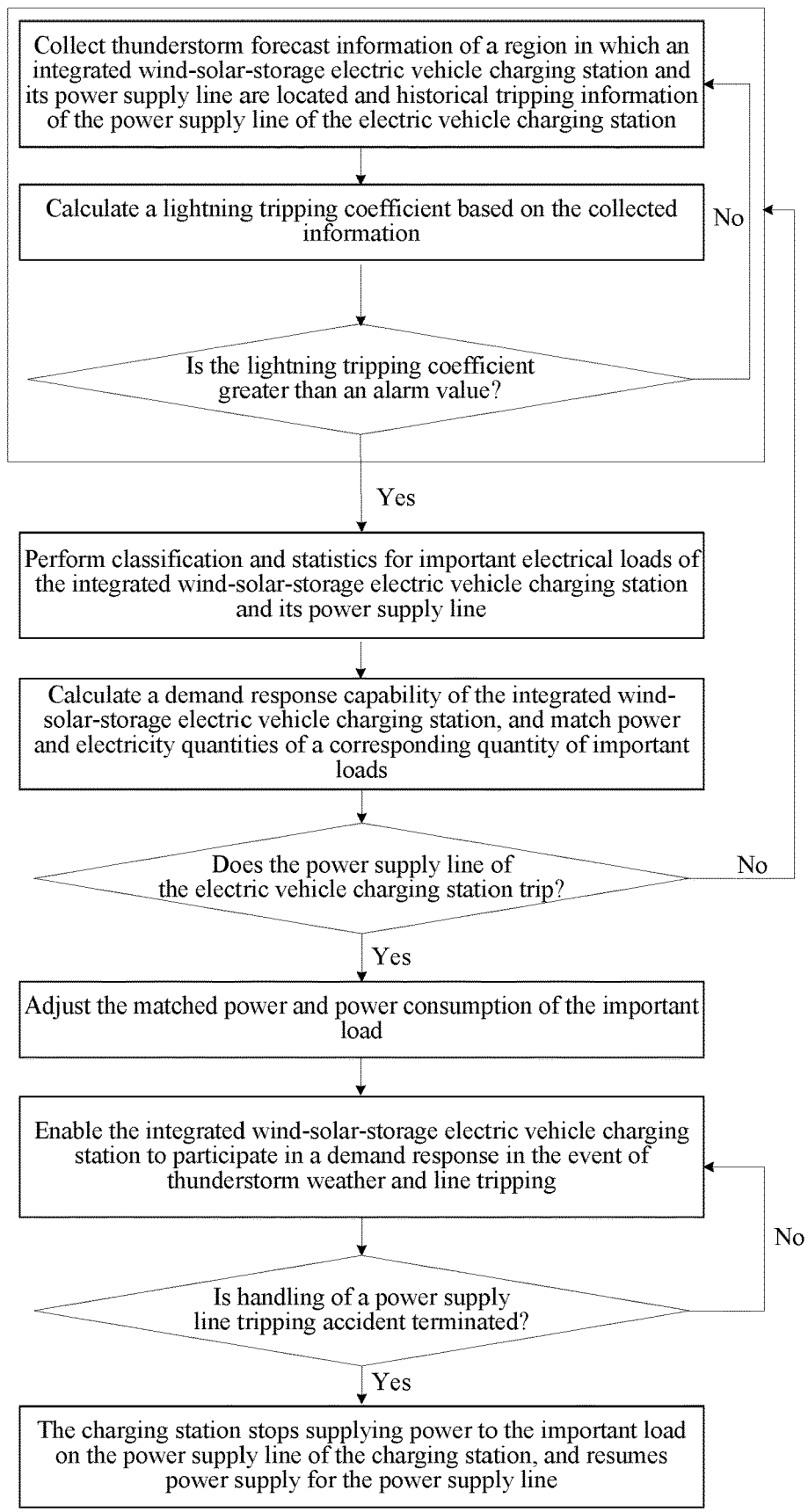
FIG. 1 is a flowchart of a response method for an integrated wind-solar-storage electric vehicle charging station during a thunderstorm.

The present disclosure further provides a response method for an integrated wind-solar-storage electric vehicle charging station during a thunderstorm. As shown in FIG. 1, the response method includes following steps.

Step 1: Collect thunderstorm forecast information of a region in which an integrated wind-solar-storage electric vehicle charging station and its power supply line are located and historical tripping information of the power supply line of the electric vehicle charging station, obtain a lightning tripping coefficient based on the collected information, and perform a step 2 if the lightning tripping coefficient is greater than an alarm value or repeat the step 1 if the lightning tripping coefficient is not greater than the alarm value.

Those skilled in the art should be aware that there are a plurality of methods for obtaining the lightning tripping coefficient, for example, collecting historical lightning tripping data and inputting it into a neural network to obtain the lightning tripping coefficient. In order to improve a calculation speed, the method for obtaining the lightning tripping coefficient in the embodiments of the present disclosure is only a preferred technical solution in an implementation process, and is not an inevitable limitation on implementation of the response method for an integrated wind-solar-storage electric vehicle charging station during a thunderstorm in the present disclosure.

Further, the electric vehicle involved in the embodiments is an electric car and is only a preferred embodiment. Those skilled in the art can apply the technical solutions of the present disclosure to any type of motor vehicle powered by electric energy.

Further, in the step 1, thunderstorm information of the region in which the electric vehicle charging station and its power supply line are located is analyzed and predicted, and a tripping possibility of the power supply line of the electric vehicle charging station is determined. Specifically, following substeps are included:

Step 1.1: Collect the thunderstorm forecast information of the region in which the electric vehicle charging station and its power supply line are located, and average meteorological parameters of a same type.

In the embodiments, the thunderstorm forecast information of the region in which the electric vehicle charging station and its power supply line are located is collected from reliable meteorological information sources of a plurality of platforms such as a meteorological network, the China Thunderbolt App, and local meteorological news, and includes a northernmost latitude $Lat_{n.T}$, a southernmost latitude $Lat_{s.T}$, a westernmost longitude $Lon_{w.T}$, and an easternmost longitude $Lon_{e.T}$ of an predicted thunderstorm, predicted start time $T_{sta}$ of the thunderstorm, duration $T_{end}$ of the thunderstorm, wind force WF during the thunderstorm, a lightning frequency $N_{fla}$, and a period $T_{fla}$ during which lightning easily occurs.

The meteorological parameters of the same type are averaged as a basis for predicting thunderstorm information of the region in which the charging station is located:

$$\begin{bmatrix} Lat_{n.T} \\ Lat_{s.T} \\ Lon_{w.T} \\ Lon_{e.T} \\ T_{sta} \\ T_{end} \\ WF \\ N_{fla} \\ T_{fla} \end{bmatrix} = ave \left\{ \begin{bmatrix} Lat_{n.T}(1) & Lat_{n.T}(2) & \ldots & Lat_{n.T}(i_c) & \ldots & Lat_{n.T}(N_c) \\ Lat_{s.T}(1) & Lat_{s.T}(2) & \ldots & Lat_{s.T}(i_c) & \ldots & Lat_{s.T}(N_c) \\ Lon_{w.T}(1) & Lon_{w.T}(2) & \ldots & Lon_{w.T}(i_c) & \ldots & Lon_{w.T}(N_c) \\ Lon_{e.T}(1) & Lon_{e.T}(2) & \ldots & Lon_{e.T}(i_c) & \ldots & Lon_{e.T}(N_c) \\ T_{sta}(1) & T_{sta}(2) & \ldots & T_{sta}(i_c) & \ldots & T_{sta}(N_c) \\ T_{end}(1) & T_{end}(2) & \ldots & T_{end}(i_c) & \ldots & T_{end}(N_c) \\ WF(1) & WF(2) & \ldots & WF(i_c) & \ldots & WF(N_c) \\ N_{fla}(1) & N_{fla}(2) & \ldots & N_{fla}(i_c) & \ldots & N_{fla}(N_c) \\ T_{fla}(1) & T_{fla}(2) & \ldots & T_{fla}(i_c) & \ldots & T_{fla}(N_c) \end{bmatrix} \right\}$$

In the above relational expression, Nc represents a total quantity of reference meteorological information sources, $Lat_{n.T}(i_c)$, $Lat_{s.T}(i_c)$, $Lon_{w.T}(i_c)$, $Lon_{e.T}(i_c)$, $T_{sta}(i_c)$, $T_{end}(i_c)$, $WF(i_c)$, $N_{fla}(i_c)$, and $T_{fla}(i_c)$ respectively represent a northernmost latitude (in ° N), a southernmost latitude (in ° N), a westernmost longitude (in ° E), an easternmost longitude (in ° E), start time (in minutes), and duration (in minutes) of a thunderstorm predicted based on an $i_c^{th}$ meteorological information source, wind force (in scales) during the thunderstorm, a lightning frequency (in times) during the thunderstorm, and a period (in minutes) during which lightning easily occurs, and ave{•} represents an algorithm for taking an average value of each row in a matrix.

Step 1.2: Calculate, based on processed thunderstorm information and the historical tripping information of the power supply line on which the electric vehicle charging station is located, the tripping possibility of the power supply line on which the electric vehicle charging station is located.

A northernmost latitude $Lat_{n.EV}$, a southernmost latitude $Lat_{s.EV}$, a westernmost longitude $Lon_{w.EV}$, and an easternmost longitude $Lon_{e.EV}$ of the region in which the charging station and its power supply line are located are obtained.

To simplify a calculation process, a geographical location of China is taken as an example. Due to small floor area of the charging station, the power supply line of the charging station, and their nearby thunderstorm range compared with total area of the Earth, the charging station, the power supply line of the charging station, and their nearby thunderstorm range are considered as a planar rectangle with longitude and latitude lines as edges, and it is set that there is indeed an overlapping part between the region in which the charging station and its power supply line are located and the nearby thunderstorm range. Under this setting, a dimension sorting matrix $LAT_{1\times4}$ and a longitude sorting matrix $LON_{1\times4}$ are established separately to establish a longitude and latitude matrix $Area_{EV.T}$ of the overlapping part:

$$LAT_{1\times4} = \text{sort} \{[ Lat_{n.T} \ Lat_{s.T} \ Lat_{n.EV} \ Lat_{s.EV} ]\}$$

$$LON_{1\times4} = \text{sort} \{[ Lon_{w.T} \ Lon_{e.T} \ Lon_{w.EV} \ Lon_{e.EV} ]\}$$

$$\text{Area}_{EV.T} = \begin{bmatrix} LAT(1,2) & LAT(1,3) \\ LON(1,2) & LON(1,3) \end{bmatrix}$$

In the above relational expressions, sort{•} represents an operation of sorting elements in the matrix in ascending order, and $LAT(1,2)$ represents a first value and a second value after sorting in the $LAT_{1\times4}$.

From this, an overlapping ratio $\eta_{EV.T}$ between the region in which the charging station and its power supply line are located and the nearby thunderstorm range during the thunderstorm is calculated:

$$\eta_{EV.T} = \frac{[\text{Area}_{EV.T}(1,2) - \text{Area}_{EV.T}(1,1)] \cdot [\text{Area}_{EV.T}(2,2) - \text{Area}_{EV.T}(2,1)]}{[Lat_{n.EV} - Lat_{s.EV}] \cdot [Lon_{e.EV} - Lon_{w.EV}]}$$

In the above relational expression, $\text{Area}_{EV.T}(1,1)$ represents a value of a first row and a first column of the matrix $\text{Area}_{EV.T}$, $\text{Area}_{EV.T}(1,2)$ represents a value of the first row and a second column of a matrix $\text{Area}_{EV.T}$, $\text{Area}_{EV.T}(2,1)$ represents a value of a second row and the first column of a matrix $\text{Area}_{EV.T}$, and $\text{Area}_{EV.T}(2,2)$ represents a value of the second row and the second column of the matrix $\text{Area}_{EV.T}$.

The overlapping ratio, the wind force, the lightning frequency, the thunderstorm duration, and the tripping status when the region in which the charging station and its power supply line are located overlaps with the nearby thunderstorm range are collected. The tripping status is represented by an integer of 0-1, where 1 indicates that the line trips, and 0 indicates that the line does not trip. In addition, all elements in a wind force data matrix WF, a lightning frequency matrix $N_{fla}$, and a thunderstorm duration matrix $T_{end}$ that include the data about the thunderstorm are normalized:

$$WF^* = WF./\max(WF)$$

$$N_{fla}^* = N_{fla}./\max(N_{fla})$$

$$T_{end}^* = T_{end}./\max(T_{end})$$

In the above relational expressions, max(WF) represents a maximum value in the wind force data matrix, $\max(N_{fla})$ represents a maximum value in the lightning frequency matrix, and $\max(T_{end})$ represents a maximum value in the thunderstorm duration matrix.

An independent variable matrix $[\eta_{EV.T}, WF^*, N_{fla}^*, T_{end}^*]$ is formed by an overlapping ratio matrix $\eta_{EV.T}$ between the region in which the charging station and its power supply line are located and the nearby thunderstorm range, a normalized wind force power matrix $WF^*$, a normalized lightning frequency matrix $N_{fla}^*$, and a normalized thunderstorm duration matrix $T_{end}^*$ during a historical thunderstorm. A tripping status matrix is a dependent variable matrix Trip. A regression coefficient matrix $[b_1 \ b_2 \ b_3 \ b_4]$ is calculated to establish a multiple linear regression model for the tripping status of the power supply line of the charging station during the thunderstorm, where $b_1$, $b_2$, $b_3$, and $b_4$ respectively represent a first regression coefficient, a second regression coefficient, a third regression coefficient, and a fourth regression coefficient.

$$[b_1 \ b_2 \ b_3 \ b_4] = \text{regress} \{[\eta_{EV.T}, WF^*, N_{fla}^*, T_{end}^*], \text{Trip}\}$$

In the above relational expression, regress{•} represents an algorithm for calculating the regression coefficient matrix, which can be implemented using a regression function in MATLAB software.

The overlapping ratio, normalized wind force, a normalized lightning frequency, and normalized thunderstorm duration the thunderstorm are substituted into a following formula to obtain the lightning tripping coefficient. When a result is closer to 1, a possibility of line tripping is greater.

$$\text{Trip}_{warn} = b_1 \cdot \eta_{EV.T} + b_2 \cdot WF^* + b_3 \cdot N_{fla}^* + b_4 \cdot T_{end}^*$$

In the above formula, $\eta_{EV.T}$ represents the overlapping ratio matrix of the region in which the electric vehicle charging station and its power supply line are located and the thunderstorm range during the historical thunderstorm; $WF^*$ represents the normalized wind force matrix during the thunderstorm; $N_{fla}^*$ represents the normalized lightning frequency matrix during the thunderstorm; $T_{end}^*$ represents the normalized thunderstorm duration matrix; and $b_1$, $b_2$, $b_3$, and $b_4$ respectively represent the first regression coefficient, the second regression coefficient, the third regression coefficient, and the fourth regression coefficient.

Step 2: Perform line-based classification and statistics for important electrical loads of the integrated wind-solar-storage electric vehicle charging station and its power supply line.

Further, in the step S2, the line-based classification and statistics are performed for the important electrical loads of the integrated wind-solar-storage electric vehicle charging station and its power supply line. A statistical method is as follows:

When the lightning tripping coefficient is greater than the alarm value $\text{Trip}_{warn}$, this step needs to be performed.

It is assumed that the charging station is located in a middle section of a distribution line, each section of the line takes a disconnector as a demarcation point, and each section of the line has a certain quantity of electrical loads. Each section of the line is numbered from near to far by extending from the charging station to two ends of the line and using a line disconnector as the demarcation point.

Statistics is taken on power and a required electricity quantity of an important electrical load on each section of the line based on different requirements for power consumption reliability.

$$P_{imp} = [\, P_{imp}(1) \;\; P_{imp}(2) \;\; \ldots \;\; P_{imp}(i_l) \;\; \ldots \;\; P_{imp}(N_l) \,]$$

$$Q_{imp} = [\, Q_{imp}(1) \;\; Q_{imp}(2) \;\; \ldots \;\; Q_{imp}(i_l) \;\; \ldots \;\; Q_{imp}(N_l) \,]$$

In the above relational expressions, $N_l$ represents a total quantity of sections of the power supply line; $P_{imp}(i_l)$ represents power of an important electrical load on an $i_l^{th}$ section of the line, which is in units of kW; and $Q_{imp}(i_l)$ represents an electricity quantity of the important load on the $i_l^{th}$ section of the line, which is in units of kWh.

Step 3: Calculate a demand response capability of the integrated wind-solar-storage electric vehicle charging station, and match power and electricity quantities of a corresponding quantity of important loads.

Those skilled in the art should know that there are many methods in the prior art for calculating the demand response capability of the electric vehicle charging station as well as power and an electricity·quantity of a load matching the demand response capability of the electric vehicle charging station. The method proposed in the embodiments of the present disclosure is only a preferred technical solution and is not necessarily a limitation on implementation of the present disclosure. Further, in the step 3, the calculating a demand response capability of the integrated wind-solar-storage electric vehicle charging station, and matching power and electricity quantities of a corresponding quantity of important loads specifically includes following substeps:

Step 3.1: Within a specified time range $t_{10}$ before the predicted start time of the thunderstorm, collect a user of an electric vehicle being charged in the charging station and a parameter of an electric vehicle participating in the demand response in a specified region.

In the embodiments, the specified time range $t_{10}$ is 15 minutes, and the specified region is a region of 6 kilometers around the charging station.

Within 15 minutes before the predicted start time of the thunderstorm, the charging station publicizes an electric vehicle demand response during the thunderstorm to the user of the electric vehicle being charged in the charging station and a user of an electric vehicle located nearby the charging station through information pushing by using a commercial app, and inform them of a return of their participation in the demand response, so as to realize an incentive demand response mode.

The charging station takes statistics on a quantity $N_{EV}$ of electric vehicles confirmed to participate in the demand response in the electric vehicle charging station, and takes statistics on a total battery capacity $E_{EV}$, a contained electricity quantity $Q_{EV}$, start charging time $\text{sta}_{EV}$, predicted stay duration $t_{EV}$, charging power $P_{EV.c}$, discharging power $P_{EV.d}$, a minimum required electricity quantity $Q_{EV.min}$, and a minimum state of charge (SoC) $\text{SOC}_{EV.min}$ of each electric vehicle. Updating is performed with a 15-minute statistical time window.

Step 3.2: Calculate the demand response capability of the electric vehicle charging station based on average wind, solar and storage output power, and match the power $P_{imp.a}$ and the electricity quantities $Q_{imp.a}$ of the corresponding quantity of important loads.

Further, the step 3.2 includes following specific content:

Power monitoring apparatuses installed on a wind turbine generator, a photovoltaic inverter, and an energy storage apparatus are used to obtain output power of the three power sources within $t_{10}$ before arrival of the thunderstorm, and an average value is taken as a reference value for power outputs of the three power sources. Preferably, $t_{10}$ is 15 minutes.

$$\begin{bmatrix} P_{W.ave} \\ P_{PV.ave} \\ P_{S.d.ave} \end{bmatrix} = ave \left\{ \begin{bmatrix} P_W(1) & P_W(2) & \ldots & P_W(i_t) & \ldots & P_W(t_{10}) \\ P_{PV}(1) & P_{PV}(2) & \ldots & P_{PV}(i_t) & \ldots & P_{PV}(t_{10}) \\ P_{S.d}(1) & P_{S.d}(2) & \ldots & P_{S.d}(i_t) & \ldots & P_{S.d}(t_{10}) \end{bmatrix} \right\}$$

In the above relational expression, $P_W(i_t)$, $P_{PV}(i_t)$, and $P_{S.d}(i_t)$ respectively represent output power of the wind turbine generator, the photovoltaic inverter, and the energy storage apparatus at an $i_t^{th}$ second; and $P_{W.ave}$, $P_{PV.ave}$, and $P_{S.d.ave}$ respectively represent the average output power of the wind turbine generator, the photovoltaic inverter, and the energy storage apparatus, which are in units of kW.

A total capacity $E_{EVS}$, a rechargeable capacity $QC_{EVS}$, and a discharging capacity $QD_{EVS}$ of the charging station are calculated based on the battery capacity of the electric vehicle and a capacity of the energy storage apparatus:

$$E_{EVS} = \sum_{i=1}^{N_{EV}} E_{EV}(i) + \sum_{i=1}^{N_S} E_S(i)$$

$$QC_{EVS} = \sum_{i=1}^{N_{EV.C}} QC_{EV}(i) + \sum_{i=1}^{N_S} QC_S(i)$$

$$QD_{EVS} = \sum_{i=1}^{N_{EV.D}} QD_{EV}(i) + \sum_{i=1}^{N_S} QD_S(i)$$

In the above relational expressions, $N_S$ represents a total quantity of energy storage apparatuses in the charging station; $E_S(i)$, $QC_S(i)$, and $QD_S(i)$ respectively represent a total capacity, a chargeable electricity quantity, and a dischargeable electricity quantity of an energy storage apparatus, which are in units of kWh; $N_{EV.C}$ and $N_{EV.D}$ respectively represent total quantities of electric vehicles that can participate in charging and discharging; and $E_{EV}(i)$, $QC_{EV}(i)$, and $QD_{EV}(i)$ respectively represent a total capacity of an $i^{th}$ electric vehicle, a chargeable electricity quantity of the $i^{th}$ electric vehicle, and a dischargeable of the $i^{th}$ electric vehicle, which are in units of kWh.

Those skilled in the art should know that there are many methods in the prior art for calculating a predicted power output of the charging station participating in the demand response. The method proposed in the embodiments of the present disclosure is only a preferred technical solution and is not necessarily a limitation on the implementation of the present disclosure. Based on the average output power of the wind turbine generator, the photovoltaic inverter, and the energy storage apparatus, and the discharging power of the electric vehicle, the predicted power output $PD_{station}$ of the charging station participating in the demand response is calculated as follows:

$$PD_{station} = P_{W.ave} + P_{PV.ave} + P_{S.ave} \cdot \eta_{S.d} + \sum_{i=1}^{N_{EV.D}} P_{EV.d}(i) \cdot \eta_{EV.d}$$

In the above relational expression, $P_{EV.d}(i)$ represents discharging power of the $i^{th}$ electric vehicle, which is in units of kW; $\eta_{S.d}$ represents discharging efficiency of the energy storage apparatus; and $\eta_{EV.d}$ represents discharging efficiency of the electric vehicle.

Based on the calculated predicted power output $PD_{station}$ and a dischargeable capacity $QD_{EVS}$ of the charging station, the important electrical loads of the corresponding quantity are matched, and a margin is left, such that power $P_{imp.a}$ and an electricity quantity $Q_{imp.a}$ of a matching important load before the line tripping are obtained:

$$\begin{cases} P_{imp.a} = \sum_{i=1}^{N'_l} P_{imp}(i) < PD_{station} \\ Q_{imp.a} = \sum_{i=1}^{N'_l} Q_{imp}(i) < QD_{EVS} \end{cases}$$

In the above relational expressions, $N'_l$ represents a quantity of sections of the power supply line that contain the important electrical load and can be carried by the charging station, $P_{imp}(i)$ represents power of the matching important load before an $i^{th}$ power supply line trips, and $Q_{imp}(i)$ represents an electricity quantity of the matching important load before the $i^{th}$ power supply line trips.

Step 4: Determine whether the power supply line of the electric vehicle charging station trips at this time, and perform a step 5 if the power supply line of the electric vehicle charging station trips, or return to the step 1 if the power supply line of the electric vehicle charging station does not trip.

Step 5: When the power supply line of the electric vehicle charging station trips, determine a location and an isolation status of a line fault point and power transmission waiting duration, and adjust matched power and a matched power consumption of the important electrical load.

Further, the step 5 in which when the power supply line of the electric vehicle charging station trips, the location and the isolation status of the line fault point and the power transmission waiting duration are determined, and the matched power and power consumption of the important electrical load are adjusted specifically includes following substeps:

Step 5.1: When the power supply line of the electric vehicle charging station trips, determine the location and an isolation status of the line fault point and the power transmission waiting duration.

Further, the step 5.1 includes following specified content:

When the power supply line of the electric vehicle charging station trips, predicted line inspection duration $T_{che}$ and predicted repair time $T_{rep}$ (in minutes) are obtained. In the embodiments, the predicted line inspection duration $T_{che}$ is notified to the charging station through a marketing department by an on-duty dispatcher who contacts a distribution department to inspect the faulty line.

Based on the predicted line inspection duration $T_{che}$, the charging station arranges the electric vehicle to participate in the demand response in the station, so as to resume power supply for important equipment in the station.

After identifying the fault point, the distribution department contacts the on-duty dispatcher to report the predicted repair time $T_{rep}$ (in minutes) and inform the location of the line fault point and an isolation plan for the fault point. The dispatcher informs the charging station of the predicted repair time $T_{rep}$ and the isolation plan for the fault point through the marketing department.

The charging station calculates predicted total duration $T_{DS}$ (in minutes) of the demand response, in other words, the power transmission waiting duration:

$$T_{DS} = T_{che} + T_{rep}$$

A report is made to the distribution department and the on-duty dispatcher through the marketing department, and relevant information of the demand response is released to the user of the electric vehicle.

Further, the step 5.2 includes following specific content:

Step 5.2: Adjust, based on an opened/closed state of the line disconnector, power $P_{imp.b}$ and an electricity quantity $Q_{imp.b}$ of an electrical load matching the demand response of the charging station:

$$\begin{cases} P_{imp.b} = \sum_{i=1}^{N'_l} P_{imp}(i) - \sum_{i=1}^{N''_l} P_{imp}(i) + \sum_{i=1}^{N'-N''_l} P_{com}(i) < PD_{station} \\ Q_{imp.b} = \sum_{i=1}^{N'_l} Q_{imp}(i) - \sum_{i=1}^{N''_l} Q_{imp}(i) + \sum_{i=1}^{N'-N''_l} Q_{com}(i) < QD_{EVS} \end{cases}$$

In the above relational expression, $$\sum_{i=1}^{N''_l} P_{imp}(i) \text{ and } \sum_{i=1}^{N''_l} Q_{imp}(i)$$

respectively represent power and an electricity quantity of a load to which no power can be transmitted based on a preset matching scheme before the tripping because the disconnector is opened;

$$\sum_{i=1}^{N'-N''_l} P_{com}(i) \text{ and } \sum_{i=1}^{N'-N''_l} Q_{com}(i)$$

respectively represent power and an electricity quantity of another load that can be powered on the line, which are in units of kW and kWh respectively; and $N''_l$ represents a quantity of sections of the power supply line, which cannot be powered based on the preset matching scheme before the tripping because the disconnector is opened.

In order to simplify a measurement instrument and improve electricity quantity forecast efficiency, the predicted total duration $T_{DS}$ of the demand response can be used to estimate an electricity quantity $Q_{imp.b}$ to be supported:

$$Q_{imp.b} = P_{imp.b} \cdot T_{DS}/60$$

Step 6: Enable the integrated wind-solar-storage electric vehicle charging station to participate in a demand response in the event of the thunderstorm and the line tripping.

Those skilled in the art should know that there are many methods in the prior art for enabling the electric vehicle charging station to participate in the demand response in the event of the thunderstorm and the line tripping. The method proposed in the present disclosure is only a preferred technical solution and is not necessarily a limitation on the implementation of the present disclosure.

Preferably, that the integrated wind-solar-storage electric vehicle charging station participates in the demand response in the event of the thunderstorm and the line tripping is intended to minimize a variance of mismatched power between power generation and power consumption of an isolated power grid in which the integrated wind-solar-storage electric vehicle charging station is located. Those skilled in the art can also select a calculation model based on an actual situation to minimize the variance of the mismatched power. The method provided in the present disclosure is only a preferred embodiment and is not necessarily a limitation on the implementation of the present disclosure.

Further, the enabling the integrated wind-solar-storage electric vehicle charging station to participate in a demand response in the event of the thunderstorm and the line tripping in the step 6 includes following specific content:

An objective function for minimizing the variance of the mismatched power of the power grid in which the charging station is located after lightning tripping is set, and wind, solar and storage power output data is synchronously sampled by taking $t_{10}$ as a charging and discharging strategy adjustment cycle, so as to perform rolling optimization on a charging and discharging strategy of the electric vehicle participating in the demand response, and an optimized charging and discharging strategy is synchronously sent to each charging pile for execution.

Mismatched power $\Delta dis(i_t)$ between the power generation and the power consumption in the isolated power grid in which the integrated wind-solar-storage electric vehicle charging station is located at an $i_t^{th}$ time point can be expressed as follows:

$$G_P(i_t) = P_W(i_t) + P_{PV}(i_t) + \sum_{j=1}^{N_{S.D}(i_t)} P_{S.d}(i_t, j) \cdot \eta_{S.d} + \sum_{k=1}^{N_{EV.D}(i_t)} P_{EV.d}(i_t, k) \cdot \eta_{EV.d}$$

$$L_P(i_t) = P_{imp.b}(i_t) + \sum_{j=1}^{N_{S.C}(i_t)} P_{S.c}(i_t, j)/\eta_{S.c} + \sum_{k=1}^{N_{EV.C}(i_t)} P_{EV.c}(i_t, k)/\eta_{EV.c}$$

$$\Delta dis(i_t) = G_P(i_t) - L_P(i_t)$$

In the above relational expressions, $G_P(i_t)$ and $L_P(i_t)$ respectively represent totally generated power and totally consumed power within the isolated power grid, which are in units of kW; $P_W(i_t)$, $P_{PV}(i_t)$, $P_{S.d}(i_t,j)$, and $P_{EV.d}(i_t,k)$ respectively represent wind power in the integrated wind-solar-storage electric vehicle charging station at the $i_t^{th}$ time point, photovoltaic power in the integrated wind-solar-storage electric vehicle charging station at the $i_t^{th}$ time point, output power of a $j^{th}$ energy storage apparatus at the $i_t^{th}$ time point, and output power of a $k^{th}$ electric vehicle at the $i_t^{th}$ time point, which are in units of kW; $P_{imp.b}(i_t)$, $P_{S.c}(i_t,j)$, and $P_{EV.c}(i_t,k)$ respectively represent power consumed by the important load of the charging station at the $i_t^{th}$ time point, power consumed by the $j^{th}$ energy storage apparatus at the $i_t^{th}$ time point, and power consumed by the $k^{th}$ electric vehicle at the $i_t^{th}$ time point, which are in units of kW; $N_{S.D}(i_t)$, $N_{EV.D}(i_t)$, $N_{S.C}(i_t)$, and $N_{EV.C}(i_t)$ respectively represent a total quantity of energy storage apparatuses that output power in the charging station at the $i_t^{th}$ time point, a total quantity of electric vehicles that output power in the charging station at the $i_t^{th}$ time point, a total quantity of energy storage apparatuses that absorb power in the charging station at the $i_t^{th}$ time point, and a total quantity of electric vehicles that absorb power in the charging station at the $i_t^{th}$ time point; $\eta_{EV.c}$ and $\eta_{S.c}$ respectively represent charging efficiency of the electric vehicle and charging efficiency of the energy storage apparatus; and $\eta_{S.d}$ and $\eta_{EV.d}$ respectively represent the discharging efficiency of the energy storage apparatus and the discharging efficiency of the electric vehicle.

The objective function minimizes the variance $D(\Delta dis)$ of the mismatched power between the power generation and the power consumption of the isolated power grid in which the integrated wind-solar-storage electric vehicle charging station is located after the lightning tripping and fault isolation.

$$\min\{D(\Delta dis)\} = \min\left\{\frac{1}{n_t}\sum_{i_t=1}^{n_t}\left[\Delta dis(i_t) - \frac{1}{n_t}\sum_{i_t=1}^{n_t}\Delta dis(i_t)\right]^2\right\}$$

In the above relational expression, $n_t$ represents a total quantity of time points within an optimization period.

Constraint 1: Stability of power supply needs to be ensured, a total generating capacity of the charging station is greater than a sum of an electricity quantity charged for the electric vehicle and the electricity quantity of the important load, and excess electric energy is stored in the electric vehicle or the energy storage apparatus.

$$\sum_{i_t=1}^{n_t} G_P(i_t) > \sum_{i_t=1}^{n_t}\left[P_{imp.b}(i_t) + \sum_{k=1}^{N_{EV.C}(i_t)} P_{EV.c}(i_t, k)/\eta_{EV.c}\right]$$

Constraint 2: a charging and discharging power constraint and an energy constraint of the energy storage apparatus, namely:

$$P_{S.c.min} \leq P_{S.c}(i_t) \leq P_{S.c.max}$$

$$QD_{S.min} \leq QD_S + P_{S.c} \cdot \Delta t \leq E_s$$

$$P_{S.d.min} \leq P_{S.d}(i_t) \leq P_{S.d.max}$$

$$QD_{S.min} \leq QD_S - P_{S.d} \cdot \Delta t \leq E_s$$

In the above relational expressions, $\Delta t$ represents a sampling interval; $P_{S.c.min}$, $P_{S.c.max}$, $P_{S.d.min}$, and $P_{S.d.max}$ respectively represent minimum charging power, maximum charging power, minimum discharging power, and maximum discharging power of the energy storage apparatus, which are in units of kW; $QD_{S.min}$ represents a minimum remaining electricity quantity of the energy storage apparatus, which is in units of kWh; $E_S$ represents a total capacity of the energy storage apparatus; $QD_S$ represents an electricity quantity that the energy storage apparatus can discharge; $P_{S.c}$ represents charging power of the energy storage apparatus; $P_{S.d}$ represents discharging power of the energy storage apparatus; $P_{S.c}(i_t)$ represents charging power of the energy storage apparatus in an $i_t^{th}$ optimization period; and $P_{S.d}(i_t)$ represents discharging power of the energy storage apparatus in the $i^{th}$ optimization period.

Constraint 3: a charging and discharging power constraint and an energy constraint of the electric vehicle, namely:

$$P_{EV.c.min} \leq P_{EV.c}(i_t) \leq P_{EV.c.max}$$
$$Q_{EV.min} \leq QD_{EV} + P_{EV.c} \cdot \Delta t \leq E_{EV}$$
$$P_{EV.d.min} \leq P_{EV.d}(i_t) \leq P_{EV.d.max}$$
$$Q_{EV.min} \leq QD_{EV} - P_{EV.d} \cdot \Delta t \leq E_{EV}$$

In the above relational expressions, $P_{EV.c.min}$, $P_{EV.c.max}$, $P_{EV.d.min}$, and $P_{EV.d.max}$ respectively represent minimum charging power, maximum charging power, minimum discharging power, and maximum discharging power of the electric vehicle, which are in units of kW; $Q_{EV.min}$ represents a minimum electricity quantity that the electric vehicle can discharge; $QD_{EV}$ represents an electricity quantity that the electric vehicle can discharge; $P_{EV.c}$ represents power consumed by the electric vehicle; $P_{EV.d}$ represents the discharging power of the electric vehicle; $P_{EV.d}(i_t)$ represents discharging power of the electric vehicle at the $i_t^{th}$ time point; $P_{EV.c}(i_t)$ represents charging power of the electric vehicle; and $E_{EV}$ represents a total electricity quantity of all electric vehicles.

Constraint 4: a limitation on a quantity of charging and discharging conversions for the electric vehicle:

$$\sum_{i_t=1}^{n_t} n_{dc}(i_t) < N_{dc.max}$$

In the above relational expression, $n_{dc}(i_t)$ represents a quantity of charging and discharging conversions of the electric vehicle at the $i_t^{th}$ time point, where 1 is counted when there is one conversion and 0 is counted when there is no conversion; and $N_{dc.max}$ represents a maximum quantity of charging and discharging conversions allowed for the electric vehicle, which is used to prevent a damage to a battery of the electric vehicle due to frequent charging and discharging conversion.

Obviously, the above objective function and the constraints 1 to 4 form a model. This model is configured to resolve an optimization problem of charging and discharging of the electric vehicle and the energy storage apparatus. The IBM Cplex can be called in MATLAB software to obtain an optimal solution of enabling the electric vehicle and the energy storage apparatus to participate in the demand response and restraining the mismatched power in a current period in the event of the thunderstorm and the line tripping.

Step 7: Determine whether handling of a power supply line tripping accident is completed, and enable the charging station to stop supplying power to an important load on the power supply line of the charging station if the handling of the power supply line tripping accident is completed, or return to the step 6 if the handling of the power supply line tripping accident is not completed.

If the step 6 is returned to perform, when a next optimization period is reached, the wind, solar and storage power output, the quantity of electric vehicles, the charging and discharging capability, the SoC, and the load state are counted or calculated, the optimization problem of charging and discharging of the electric vehicle and the energy storage apparatus is solved again, and a result is sent to the charging pile for execution.

If the step 6 is not returned, it means that the demand response is terminated. In this case, the tripped power supply line is overhauled, a safety measure is removed, staff are evacuated, the power transmission is resumed, and the charging station stops supplying power to the important load on its power supply line, so as to prevent asynchronous grid connection and ensure that normal wiring and power transmission is safely restored for the power supply line.

The applicant of the present disclosure has made a detailed description of the implementation examples of the present disclosure with reference to the accompanying drawings in the specification. However, those skilled in the art should understand that the above implementation examples are only preferred implementation solutions of the present disclosure, and the detailed description is only to help readers better understand the spirit of the present disclosure, rather than to limit the protection scope of the present disclosure. On the contrary, any improvement or modification based on the spirit of the present disclosure shall fall within the protection scope of the present disclosure.

The invention claimed is:

1. A response system for an integrated wind-solar-storage electric vehicle charging station during a thunderstorm, wherein the system comprises a lightning tripping coefficient calculation module, an important electrical load classification module, an important load power and electricity quantity matching module, a power supply line tripping determining module, an important electrical load power and power consumption adjustment module, a demand response target realization module, and a power supply line tripping accident determining module, wherein the lightning tripping coefficient calculation module is configured to collect thunderstorm forecast information and historical tripping information of a power supply line on which an electric vehicle charging station is located in a region, calculate a lightning tripping coefficient, and determine whether to call the important electrical load classification module in the system based on a calculation result;

the important electrical load classification module is configured to separately take statistics on power and a required electricity quantity of an important electrical load on each section of the line, and input a result into the important load power and electricity quantity matching module;

the important load power and electricity quantity matching module is configured to calculate, based on the received result, power of a matching important load before line tripping and an electricity quantity of the matching important load before the line tripping;

the power supply line tripping determining module is configured to: determine whether the power supply line on which the electric vehicle charging station is located trips at this time; and if the power supply line trips, call the important electrical load power and power consumption adjustment module; or if the power supply line does not trip, re-call the lightning tripping coefficient calculation module;

the important electrical load power and power consumption adjustment module is configured to determine a location and an isolation status of a line fault point and power transmission waiting duration, so as to adjust power and an electricity quantity of an electrical load matching a demand response of the charging station, and call the demand response target realization module; and the demand response target realization module is configured to calculate a minimum variance of unmatched power between power generation and power consumption of an isolated power grid in which the integrated wind-solar-storage electric vehicle charging station is located.

2. The response system for an integrated wind-solar-storage electric vehicle charging station during a thunderstorm according to claim 1, wherein
the important load power and electricity quantity matching module is configured to extend from the charging station to two ends of the line, number each section of the line from near to far by using a line disconnector as a demarcation point, and take statistics on the power and the required electricity quantity of the important electrical load on each section of the line based on different requirements for power consumption reliability.

3. The response system for an integrated wind-solar-storage electric vehicle charging station during a thunderstorm according to claim 1, wherein
the demand response target realization module is configured to: set an objective function for minimizing a variance of the mismatched power of the power grid $\Delta dis(i_t)$ in which the charging station is located after lightning tripping, and synchronously sample wind, solar and storage power output data by taking $t_{10}$ as a charging and discharging strategy adjustment cycle, so as to optimize a charging and discharging strategy of an electric vehicle participating in the demand response in each charging and discharging strategy adjustment cycle, with a goal of minimizing the mismatched power of the power grid in which the charging station is located; and synchronously send an optimized charging and discharging strategy to each charging pile for execution.

4. The response system for an integrated wind-solar-storage electric vehicle charging station during a thunderstorm according to claim 3, wherein
the objective function for minimizing the variance of the mismatched power $\Delta dis(i_t)$ between the power generation and the power consumption of the isolated power grid in which the integrated wind-solar-storage electric vehicle charging station is located is obtained by calculating a minimum solution of an average value, in all optimization periods, of a square of a difference between the mismatched power between the power generation and the power consumption and average mismatched power between the power generation and power consumption in all the optimization periods.

5. The response system for an integrated wind-solar-storage electric vehicle charging station during a thunderstorm according to claim 1, wherein
the mismatched power between the power generation and the power consumption of the isolated power grid in which the integrated wind-solar-storage electric vehicle charging station is located is obtained by calculating a difference between totally generated power in the isolated power grid and totally consumed power in the isolated power grid.

6. A response method for an integrated wind-solar-storage electric vehicle charging station during a thunderstorm based on the response system for an integrated wind-solar-storage electric vehicle charging station during a thunderstorm according to claim 1, wherein the method comprises:

step 1: collecting thunderstorm forecast information of a region in which an electric vehicle charging station and its power supply line are located and historical tripping information of the power supply line, calculating a lightning tripping coefficient based on the collected information, and performing a step 2 if the lightning tripping coefficient is greater than an alarm value or repeating the step 1 if the lightning tripping coefficient is not greater than the alarm value;

step 2: performing line-based sectioning for important electrical loads of the electric vehicle charging station and its power supply line;

step 3: calculating a demand response capability of the electric vehicle charging station, and matching power and electricity quantities of a corresponding quantity of important electrical loads;

step 4: determining whether the power supply line of the electric vehicle charging station trips at this time, and performing a step 5 if the power supply line of the electric vehicle charging station trips, or returning to the step 1 if the power supply line of the electric vehicle charging station does not trip;

step 5: determining a location and an isolation status of a line fault point and power transmission waiting duration, and adjusting the matched power and electricity quantity of the important electrical load;

step 6: enabling the electric vehicle charging station to participate in a demand response in the event of a thunderstorm and line tripping; and step 7: determining whether handling of a power supply line tripping accident is completed, and stopping, by the charging station, supplying power to an important load on the power supply line of the charging station if the handling of the power supply line tripping accident is completed, or returning to the step 6 if the handling of the power supply line tripping accident is not completed.

7. The response method for an integrated wind-solar-storage electric vehicle charging station during a thunderstorm according to claim 6, wherein
the step 1 comprises:
step 1.1: collecting the thunderstorm forecast information of the region in which the electric vehicle charging station and its power supply line are located, wherein the thunderstorm forecast information comprises: a northernmost latitude $Lat_{n.T}$, a southernmost latitude $Lat_{s.T}$, a westernmost longitude $Lon_{w.T}$, and an easternmost longitude $Lon_{e.T}$ of an predicted thunderstorm, predicted start time $T_{sta}$ of the thunderstorm, duration $T_{end}$ of the thunderstorm, wind force WF during the thunderstorm, a lightning frequency $N_{fla}$ during the thunderstorm, and a period $T_{fla}$ during which lightning easily occurs;

step 1.2: calculating an average value for thunderstorm forecast information of a same type; and step 1.3; calculating a tripping possibility based on average thunderstorm forecast information and the historical tripping information of the power supply line.

8. The response method for an integrated wind-solar-storage electric vehicle charging station during a thunderstorm according to claim 7, wherein
the tripping possibility $\text{Trip}_{warn}$ meets a following relational expression:

$$\text{Trip}_{warn}=b_1 \cdot \eta_{EV.T}+b_2 \cdot WF^*+b_3 \cdot N^*_{fla}+b_4 \cdot T_{end}^*$$

wherein $\eta_{EV.T}$ represents an overlapping ratio matrix of the region in which the electric vehicle charging station and its power supply line are located and a thunderstorm range during historical thunderstorm weather; $WF^*$ represents a normalized wind force matrix during the thunderstorm; $N^*_{fla}$ represents a normalized lightning frequency matrix during the thunderstorm; $T_{end}^*$ represents a normalized thunderstorm duration matrix; and $b_1$, $b_2$, $b_3$, and $b_4$ respectively represent a first regression coefficient, a second regression coefficient, a third regression coefficient, and a fourth regression coefficient.

9. The response method for an integrated wind-solar-storage electric vehicle charging station during a thunderstorm according to claim 8, wherein
the overlapping ratio matrix $\eta_{EV.T}$ of the region in which the electric vehicle charging station and its power supply line are located and the thunderstorm range during the historical thunderstorm weather is constituted by an overlapping ratio $\eta_{EV.T}$ between the region in which the electric vehicle charging station and its power supply line are located and the thunderstorm range during the historical thunderstorm weather, and the $\eta_{EV.T}$ meets a following relational expression:

$$\eta_{EV.T} = \frac{[\text{Area}_{EV.T}(1,2)-\text{Area}_{EV.T}(1,1)] \cdot [\text{Area}_{EV.T}(2,2)-\text{Area}_{EV.T}(2,1)]}{[Lat_{n.EV}-Lat_{s.EV}] \cdot [Lon_{e.EV}-Lon_{w.EV}]}$$

wherein $Lat_{n.EV}$ represents a northernmost latitude of the region in which the power supply line is located, $Lat_{s.EV}$ represents a southernmost latitude of the region in which the power supply line is located, $Lon_{w.EV}$ represents a westernmost longitude of the region in which the power supply line is located, $Lon_{e.EV}$ represents an easternmost longitude of the region in which the power supply line is located, $\text{Area}_{EV.T}(1,1)$ represents a value of a first row and a first column of a matrix $\text{Area}_{EV.T}$, $\text{Area}_{EV.T}(1,2)$ represents a value of the first row and a second column of the matrix $\text{Area}_{EV.T}$, $\text{Area}_{EV.T}(2,1)$ represents a value of a second row and the first column of the matrix $\text{Area}_{EV.T}$, and $\text{Area}_{EV.T}(2,2)$ represents a value of the second row and the second column of the matrix $\text{Area}_{EV.T}$; and
the matrix $\text{Area}_{EV.T}$ meets a following relational expression:

$$\text{Area}_{EV.T} = \begin{bmatrix} LAT(1,2) & LAT(1,3) \\ LON(1,2) & LON(1,3) \end{bmatrix}$$

wherein $LAT(1,2)$ represents a first value and a second value in $LAT_{1\times 4}$, $LAT(1,3)$ represents the first value and a third value in the $LAT_{1\times 4}$; $LON(1,2)$ represents a first value and a second value in $LON_{1\times 4}$, and $LAT(1,3)$ represents the first value and a third value in the $LON_{1\times 4}$;

$$LAT_{1\times 4} = \text{sort}\{[Lat_{n.T} \quad Lat_{s.T} \quad Lat_{n.EV} \quad Lat_{s.EV}]\}$$

$$LON_{1\times 4} = \text{sort}\{[Lon_{w.T} \quad Lon_{e.T} \quad Lon_{w.EV} \quad Lon_{e.EV}]\}$$

wherein $\text{sort}\{\bullet\}$ represents an operation of sorting elements in the matrix in ascending order, $Lat_{n.T}$ represents the northernmost latitude of the predicted thunderstorm, $Lat_{s.T}$ represents the southernmost latitude of the predicted thunderstorm, $Lon_{w.T}$ represents the westernmost longitude of the predicted thunderstorm, and $Lon_{e.T}$ represents the easternmost longitude of the predicted thunderstorm.

10. The response method for an integrated wind-solar-storage electric vehicle charging station during a thunderstorm according to claim 6, wherein
in the step 2, assuming that the electric vehicle charging station is located in a middle section of the power supply line, a disconnector is used as a demarcation point for each section of the power supply line, and there are a certain quantity of electrical loads on each section of the line, a plurality of sections of the power supply line are obtained by extending from the electric vehicle charging station to two ends of the power supply line and taking the disconnector as the demarcation point, and each section of the power supply line is numbered from near to far, such that power $P_{imp}$ and an electricity quantity $Q_{imp}$ of an important electrical load on each section of the power supply line meet a following relational expression:

$$P_{imp} = [P_{imp}(1) \quad P_{imp}(2) \quad \ldots \quad P_{imp}(i_l) \quad \ldots \quad P_{imp}(N_l)]$$

$$Q_{imp} = [Q_{imp}(1) \quad Q_{imp}(2) \quad \ldots \quad Q_{imp}(i_l) \quad \ldots \quad Q_{imp}(N_l)]$$

wherein $N_l$ represents a total quantity of sections of the power supply line, $P_{imp}(i_l)$ represents power of an important electrical load on an $i_l^{th}$ section of the power supply line, and $Q_{imp}(i_l)$ represents an electricity quantity of the important electrical load on the $i_l^{th}$ section of the power supply line.

11. The response method for an integrated wind-solar-storage electric vehicle charging station during a thunderstorm according to claim 6, wherein
the step 3 comprises:
step 3.1: within a specified time range $t_{10}$ before the predicted start time of the thunderstorm, collecting a parameter of an electric vehicle being charged in the electric vehicle charging station and a parameter of an electric vehicle participating in the demand response in a specified region; and
step 3.2: calculating the demand response capability of the electric vehicle charging station based on average wind, solar and storage output power, and matching the power $P_{imp.a}$ and the electricity quantities $Q_{imp.a}$ of the corresponding quantity of important electrical loads according to following relational expressions:

$$\begin{cases} P_{imp.a} = \sum_{i=1}^{N'_l} P_{imp}(i) < PD_{station} \\ Q_{imp.a} = \sum_{i=1}^{N'_l} Q_{imp}(i) < QD_{EVS} \end{cases}$$

wherein $N_l$ represents a total quantity of sections of the power supply line that contain the important electrical load and that can be carried by the electric vehicle charging station, $P_{imp}(i)$ represents matched power of the important electrical load before an $i^{th}$ section of the power supply line trips, $Q_{imp}(i)$ represents a matched electricity quantity of the important electrical load before the $i^{th}$ section of the power supply line trips, $PD_{station}$ represents an predicted power output of the electric vehicle charging station in participating in the demand response, and $QD_{EVS}$ represents a dischargeable capacity of the electric vehicle.

12. The response method for an integrated wind-solar-storage electric vehicle charging station during a thunderstorm according to claim 11, wherein the predicted power output $PD_{station}$ of the electric vehicle charging station in participating in the demand response meets a following relational expression:

$$PD_{station} = P_{W.ave} + P_{PV.ave} + P_{S.ave} \cdot \eta_{S.d} + \sum_{ii=1}^{N_{EV.D}} P_{EV.d}(ii) \cdot \eta_{EV.d}$$

wherein $P_{W.ave}$, $P_{PV.ave}$, and $P_{S.ave}$ respectively represent average output power of a wind turbine generator, a photovoltaic inverter, and an energy storage apparatus, $P_{EV.d}(ii)$ represents discharging power of an $ii^{th}$ electric vehicle, $\eta_{S.d}$ represents discharging efficiency of the energy storage apparatus, $\eta_{EV.d}$ represents discharging efficiency of the electric vehicle, and $N_{EV.D}$ represents a total quantity of electric vehicles that participate in discharging.

13. The response method for an integrated wind-solar-storage electric vehicle charging station during a thunderstorm according to claim 6, wherein the step 5 comprises:

step 5.1: determining the location of the line fault point, time required for isolating and repairing the fault point, and the power transmission waiting duration; and step 5.2: adjusting, based on an opened/closed state of the line disconnector according to a following relational expression, power $P_{imp.b}$ and an electricity quantity $Q_{imp.b}$ of an important electrical load matching the demand response of the electric vehicle charging station:

$$\begin{cases} P_{imp.b} = \sum_{i=1}^{N'_l} P_{imp}(i) - \sum_{i=1}^{N''_l} P_{imp}(i) + \sum_{i=1}^{N'-N''_l} P_{com}(i) < PD_{station} \\ Q_{imp.b} = \sum_{i=1}^{N'_l} Q_{imp}(i) - \sum_{i=1}^{N''_l} Q_{imp}(i) + \sum_{i=1}^{N'-N''_l} Q_{com}(i) < QD_{EVS} \end{cases}$$

wherein $$\sum_{i=1}^{N''_l} P_{imp}(i) \text{ and } \sum_{i=1}^{N''_l} Q_{imp}(i)$$

respectively represent power and an electricity quantity of an important electrical load to which no power can be transmitted based on a matching scheme before the tripping because the disconnector is opened;

$$\sum_{i=1}^{N'-N''_l} P_{com}(i) \text{ and } \sum_{i=1}^{N'-N''_l} Q_{com}(i)$$

respectively represent power and an electricity quantity of another electrical load that can be powered on the power supply line, wherein the power of the another electrical load represents load power excluding the power of the important electrical load, and the electricity quantity of the another electrical load represents an electricity quantity of a load, excluding the electricity quantity of the important electrical load; and $N_l''$ represents a quantity of sections of the power supply line, which cannot be powered based on the matching scheme before the tripping because the disconnector is opened.

14. The response method for an integrated wind-solar-storage electric vehicle charging station during a thunderstorm according to claim 6, wherein in the step 6, a minimum variance of mismatched power $\Delta dis(i_t)$ between power generation and power consumption of a power grid in which the electric vehicle charging station is located after lightning tripping is used as an objective function, and a time range $t_{10}$ is set as a charging and discharging strategy adjustment cycle to synchronously sample wind, solar and storage power output data and obtain the mismatched power between the power generation and the power consumption of the power grid in which the electric vehicle charging station is located after the lightning tripping in each charging and discharging strategy adjustment cycle, to optimize a charging and discharging strategy of the electric vehicle charging station in participating in the demand response, and an optimized charging and discharging strategy is synchronously sent to each charging pile for execution.

15. The response method for an integrated wind-solar-storage electric vehicle charging station during a thunderstorm according to claim 14, wherein the minimum variance of the mismatched power $\Delta dis(i_t)$ between the power generation and the power consumption of the isolated power grid in which the integrated wind-solar-storage electric vehicle charging station is located is used as the objective function, which meets a following relational expression:

$$\min\{D(\Delta dis)\} = \min\left\{\frac{1}{n_t}\sum_{i_t=1}^{n_t}\left[\Delta dis(i_t) - \frac{1}{n_t}\sum_{i_t=1}^{n_t}\Delta dis(i_t)\right]^2\right\}$$

wherein $n_t$ represents a total quantity of time points within an optimization period.

16. The response method for an integrated wind-solar-storage electric vehicle charging station during a thunderstorm according to claim 15, wherein the mismatched power $\Delta dis(i_t)$ between the power generation and the power consumption of the isolated power grid in which the integrated wind-solar-storage electric vehicle charging station is located meets following relational expressions:

$$\Delta dis(i_t) = G_P(i_t) - L_P(i_t)$$

$$G_P(i_t) = P_W(i_t) + P_{PV}(i_t) + \sum_{j=1}^{N_{S.D}(i_t)} P_{S.d}(i_t, j) \cdot \eta_{S.d} + \sum_{k=1}^{N_{EV.D}(i_t)} P_{EV.d}(i_t, k) \cdot \eta_{EV.d}$$

$$L_P(i_t) = P_{imp.b}(i_t) + \sum_{j=1}^{N_{S.C}(i_t)} P_{S.c}(i_t, j)/\eta_{S.c} + \sum_{k=1}^{N_{EV.C}(i_t)} P_{EV.c}(i_t, k)/\eta_{EV.c}$$

wherein $G_P(i_t)$ and $L_P(i_t)$ respectively represent totally generated power and totally consumed power within the isolated power grid; $P_W(i_t)$, $P_{PV}(i_t)$, $P_{S.d}(i_t,j)$ and $P_{EV.d}(i_t,k)$ respectively represent wind power in the integrated wind-solar-storage electric vehicle charging station at an $i_t^{th}$ time point, photovoltaic power in the integrated wind-solar-storage electric vehicle charging station at the $i_t^{th}$ time point, output power of a $j^{th}$ energy storage apparatus at the $i_t^{th}$ time point, and output power of a $k^{th}$ electric vehicle at the $i_t^{th}$ timepoint: $P_{imp.b}(i_t)$, $P_{S.c}(i_t,j)$, and $P_{EV.c}(i_t,k)$ respectively represent power of the important electrical load of the integrated wind-solar-storage electric vehicle charging station at the $i_t^{th}$ time point, power consumed by the $j^{th}$ energy storage apparatus at the $i_t^{th}$ time point, and power consumed by the $k^{th}$ electric vehicle at the $i_t^{th}$ time point; $N_{S.D}(i_t)$, $N_{EV.D}(i_t)$, $N_{S.C}(i_t)$, and $N_{EV.C}(i_t)$ respectively represent a total quantity of energy storage apparatuses that output power in the integrated wind-solar-storage electric vehicle charging station at the $i_t^{th}$ time point, a total quantity of electric vehicles that output power in the integrated wind-solar-storage electric vehicle charging station at the $i_t^{th}$ time point, a total quantity of energy storage apparatuses that absorb power in the integrated wind-solar-storage electric vehicle charging station at the $i_t^{th}$ time point, and a total quantity of electric vehicles that absorb power in the integrated wind-solar-storage electric vehicle charging station at the $i_t^{th}$ time point; $\eta_{EV.c}$ and $\eta_{S.c}$ respectively represent charging efficiency of the electric vehicle and charging efficiency of the energy storage apparatus; and $\eta_{S.d}$ and $\eta_{EV.d}$ respectively represent discharging efficiency of the energy storage apparatus and discharging efficiency of the electric vehicle.

17. The response method for an integrated wind-solar-storage electric vehicle charging station during a thunderstorm according to claim 16, wherein the objective function needs to meet a constraint that a total generating capacity of the integrated wind-solar-storage electric vehicle charging station is greater than a sum of an electricity quantity charged for the electric vehicle and electricity quantities of all important electrical loads, and an excess electricity quantity is stored in the electric vehicle or the energy storage apparatus, and meets a following relational expression:

$$\sum_{i_t=1}^{n_t} G_P(i_t) > \sum_{i_t=1}^{n_t} \left[ P_{imp.b}(i_t) + \sum_{k=1}^{N_{EV.C}(i_t)} P_{EV.c}(i_t, k)/\eta_{EV.c} \right].$$

18. The response method for an integrated wind-solar-storage electric vehicle charging station during a thunderstorm according to claim 16, wherein the objective function needs to meet a charging and discharging power constraint and an energy constraint of the energy storage apparatus, namely:

$$P_{S.c.min} \le P_{S.c}(i_t) \le P_{S.c.max}$$

$$QD_{S.min} \le QD_S + P_{S.c} \cdot \Delta t \le E_S$$

$$P_{S.d.min} \le P_{S.d}(i_t) \le P_{S.d.max}$$

$$QD_{S.min} \le QD_S - P_{S.d} \cdot \Delta t \le E_S$$

wherein $\Delta t$ represents a sampling interval; $P_{S.c.min}$, $P_{S.c.max}$, $P_{S.d.min}$, and $P_{S.d.max}$ respectively represent minimum charging power, maximum charging power, minimum discharging power, and maximum discharging power of the energy storage apparatus; $QD_{S.min}$ represents a minimum remaining electricity quantity of the energy storage apparatus; $E_S$ represents a total capacity of the energy storage apparatus; $QD_S$ represents an electricity quantity that the energy storage apparatus can discharge; $P_{S.c}$ represents charging power of the energy storage apparatus; $P_{S.d}$ represents discharging power of the energy storage apparatus; $P_{S.c}(i_t)$ represents charging power of the energy storage apparatus in an $i_t^{th}$ optimization period; and $P_{S.d}(i_t)$ represents discharging power of the energy storage apparatus in the $i_t^{th}$ optimization period.

19. The response method for an integrated wind-solar-storage electric vehicle charging station during a thunderstorm according to claim 18, wherein the objective function needs to meet a charging and discharging power constraint and an energy constraint of the electric vehicle, namely:

$$P_{EV.c.min} \le P_{EV.c}(i_t) \le P_{EV.c.max}$$

$$QD_{EV.min} \le QD_{EV} + P_{EV.c} \cdot \Delta t \le E_{EV}$$

$$P_{EV.d.min} \le P_{EV.d}(i_t) \le P_{EV.d.max}$$

$$QD_{EV.min} \le QD_{EV} - P_{EV.d} \cdot \Delta t \le E_{EV}$$

wherein $P_{EV.c.min}$, $P_{EV.c.max}$, $P_{EV.d.min}$, and $P_{EV.d.max}$ respectively represent minimum charging power, maximum charging power, minimum discharging power, and maximum discharging power of the electric vehicle; $Q_{EV.min}$ represents a minimum electricity quantity that the electric vehicle can discharge; $QD_{EV}$ represents an electricity quantity that the electric vehicle can discharge; $P_{EV.c}$ represents power consumed by the electric vehicle; $P_{EV.d}$ represents discharging power of the electric vehicle; $P_{EV.d}(i_t)$ represents discharging power of the electric vehicle at the $i_t^{th}$ time point; $Q_{EV.min}$ represents a minimum electricity quantity demand of the electric vehicle; $P_{EV.c}(i_t)$ represents charging power of the electric vehicle; and $E_{EV}$ represents a total electricity quantity of all electric vehicles.

20. The response method for an integrated wind-solar-storage electric vehicle charging station during a thunderstorm according to claim 19, wherein the objective function needs to meet a constraint on a quantity of charging and discharging conversions of the electric vehicle, namely:

$$\sum_{i_t=1}^{n_t} n_{dc}(i_t) < N_{dc.max}$$

wherein $n_{dc}(i_t)$ represents a quantity of charging and discharging conversions of the electric vehicle at the $i_t^{th}$ time point, wherein 1 is counted when there is one conversion and 0 is counted when there is no conversion; and $N_{dc.max}$ represents a maximum quantity of charging and discharging conversions allowed for the electric vehicle.

\* \* \* \* \*